(12) United States Patent
Remesat

(10) Patent No.: US 11,731,878 B2
(45) Date of Patent: Aug. 22, 2023

(54) PRODUCTION OF CARBON FIBER FROM ASPHALTENES

(71) Applicant: SUNCOR ENERGY INC., Calgary (CA)

(72) Inventor: Darius Remesat, Calgary (CA)

(73) Assignee: SUNCOR ENERGY INC., Calgary (CA)

( * ) Notice: Subject to any disclaimer, the term of this patent is extended or adjusted under 35 U.S.C. 154(b) by 9 days.

(21) Appl. No.: 17/375,873

(22) Filed: Jul. 14, 2021

(65) Prior Publication Data

US 2023/0020290 A1 Jan. 19, 2023

(51) Int. Cl.
| | | |
|---|---|---|
| *C10C 3/08* | (2006.01) | |
| *C10G 21/14* | (2006.01) | |
| *C10G 21/28* | (2006.01) | |
| *D01D 5/08* | (2006.01) | |
| *D01D 10/02* | (2006.01) | |
| *D01F 9/14* | (2006.01) | |
| *D01F 9/145* | (2006.01) | |

(Continued)

(52) U.S. Cl.
CPC ............ *C01B 32/33* (2017.08); *C01B 32/354* (2017.08); *C01B 32/39* (2017.08); *C10C 3/002* (2013.01); *C10G 21/003* (2013.01); *D01D 5/084* (2013.01); *D01F 9/155* (2013.01)

(58) Field of Classification Search
CPC ......... C10C 3/002; C10C 3/08; C10G 21/003; C10G 21/14; C10G 21/28; D01D 5/08; D01D 10/02; D01F 9/14; D01F 9/145; D01F 9/15; D01F 9/155

USPC ....... 264/29.2, 29.7, 211.11, 211.15, 211.17; 423/447.1, 447.4, 447.5, 447.8; 208/45, 208/309, 337
See application file for complete search history.

(56) References Cited

U.S. PATENT DOCUMENTS 2,715,603 A * 8/1955 Lanning ............... C10G 21/003
208/162
4,032,430 A 6/1977 Lewis
(Continued)

FOREIGN PATENT DOCUMENTS

CA 2844000 C 8/2014
CN 101591819 A * 12/2009 ............... D01F 9/15
(Continued)

OTHER PUBLICATIONS

Translation of CN 101591819 A (published on Dec. 2, 2009).*
(Continued)

*Primary Examiner* — Leo B Tentoni
(74) *Attorney, Agent, or Firm* — Bradley Arant Boult Cummings LLP; Timothy L. Capria; Alexandra C. Lynn

(57) ABSTRACT

There is provided a process and system for producing carbon fiber products. The process can involve deasphalting a heavy hydrocarbon feedstock, which can contain native asphaltenes, to produce a solid asphaltene particulate material, which can be further treated to produce the carbon fiber products. In some implementations, the solid asphaltene particulate material can be extruded in the presence of a polymer. In some implementations, the solid asphaltene particulate material can be chemically treated with a chemical agent including a Lewis acid, an oxidizing agent and/or a reducing agent before extrusion. In some implementations, the process can further produce activated carbon fibers.

20 Claims, 4 Drawing Sheets

(51) Int. Cl.
*D01F 9/15* (2006.01)
*C01B 32/33* (2017.01)
*C01B 32/39* (2017.01)
*D01F 9/155* (2006.01)
*D01D 5/084* (2006.01)
*C01B 32/354* (2017.01)
*C10G 21/00* (2006.01)
*C10C 3/00* (2006.01)

(56) References Cited

U.S. PATENT DOCUMENTS

| | | |
|---|---|---|
| 4,454,023 A | 6/1984 | Lutz |
| 4,462,893 A | 7/1984 | Moriya et al. |
| 4,572,281 A | 2/1986 | Mullner et al. |
| 4,572,781 A * | 2/1986 | Krasuk ............... C10G 21/003 208/309 |
| 4,781,819 A * | 11/1988 | Chirinos ............... C10G 21/28 208/309 X |
| 5,149,517 A * | 9/1992 | Fain ....................... D01F 9/155 264/29.2 X |
| 7,101,499 B1 | 9/2006 | Bronicki et al. |
| 9,150,794 B2 | 10/2015 | Corscadden et al. |
| 9,200,211 B2 | 12/2015 | Corscadden et al. |
| 9,580,839 B2 | 2/2017 | Bronicki et al. |
| 9,976,093 B2 | 5/2018 | Corscadden et al. |
| 2013/0036714 A1 | 2/2013 | Bolton et al. |
| 2014/0175688 A1* | 6/2014 | Bohnert ............... D01F 9/155 264/29.2 X |

FOREIGN PATENT DOCUMENTS

| | | | |
|---|---|---|---|
| FR | 2756841 A1 * | 6/1998 | ............. D01F 9/145 |
| JP | 05139712 A * | 6/1993 | ............... D01F 9/14 |
| WO | 2013/044346 A1 | 4/2013 | |

OTHER PUBLICATIONS

Translation of FR 2756841 A1 (published on Jun. 12, 1998).*
Translation of JP 05139712 A (published on Jun. 8, 1993).*
PCT notification of transmittal of the international search report and the written opinion of the international searching authority, international app. No. PCT/CA2019/050050, dated Sep. 13, 2019.
PCT written opinion of the international search report and the written opinion of the international searching authority, international app. No. PCT/CA2019/050050, dated Sep. 13, 2019.

* cited by examiner

PRODUCTION OF CARBON FIBER FROM ASPHALTENES

TECHNICAL FIELD

The technical field generally relates to a process and system for producing carbon fibers from asphaltenes present in a heavy hydrocarbon feedstock. More particularly, the technical field relates to a process and system involving several treatments to pre-condition the carbon fiber feedstock before obtaining the final carbon fiber product.

BACKGROUND

Carbon fibers have been used for decades in several industries including aerospace, civil engineering, military, motorsports, along with other competition sports, to name a few examples. Carbon fibers present properties such high stiffness, high tensile strength, low weight to strength ratio, high chemical resistance, high temperature tolerance and low thermal expansion, which made them very popular in industry. It is desirable to be able to produce carbon fiber for industry from readily available materials.

Some aspects of the present technology will become readily apparent to those skilled in the art from the following detailed description, wherein various implementations are shown and described by way of illustration. The drawings and detailed description are to be regarded as illustrative in nature and not as restrictive.

SUMMARY

In some implementations, the present technology relates to a process for producing a carbon fiber product from a heavy hydrocarbon feedstock comprising native asphaltenes, comprising:
  solvent deasphalting the heavy hydrocarbon feedstock comprising native asphaltenes with a solvent to precipitate asphaltenes and form solid asphaltene precipitates and produce deasphalted oil;
  separating the deasphalted oil from the solid asphaltene precipitates to recover a slurry stream comprising the asphaltene precipitates and residual solvent;
  separating the slurry stream to produce a solid asphaltene particulate material and a recovered solvent stream;
  treating the solid asphaltene particulate material to obtain the carbon fiber product.

In some implementations, the heavy hydrocarbon feedstock comprises a bitumen-containing feedstock derived from a surface mining operation or an in situ extraction operation.

In some implementations, the solvent used for the solvent deasphalting comprises at least one $C_3$-$C_8$ hydrocarbon.

In some implementations, the solvent used for the solvent deasphalting comprises at least one of $C_5$-$C_8$ hydrocarbon.

In some implementations, the solvent used for the solvent deasphalting comprises a mixture of $C_5$-$C_8$ hydrocarbons.

In some implementations, the solid asphaltene particulate material comprises 95 wt % or more C5+ asphaltenes.

In some implementations, separating the slurry stream comprises vaporizing the residual solvent to produce a vapour/solid mixture comprising vaporized solvent and the solid asphaltene precipitates, and subjecting the vapour/solid mixture to inertial separation.

In some implementations, treating the solid asphaltene particulate material comprises:
  extruding the solid asphaltene particulate material to produce extruded asphaltenes; spinning the extruded asphaltenes into a continuous asphaltene thread;
  heat treating the continuous asphaltene thread to produce a stabilized asphaltene thread;
  carbonizing the stabilized asphaltene thread to produce a carbonized carbon fiber; and
  conditioning the carbonized carbon fiber to produce the carbon fiber product.

In some implementations, spinning comprises melt spinning.

In some implementations, heat treating is performed at about 175° C. to about 290° C. (about 350° F. to about 550° F.) for up to 1 hour.

In some implementations, carbonizing is performed at about 995° C. to about 2000° C. (about 1823° F. to about 3632° F.) for up to 1 hour.

In some implementations, conditioning comprises surface treating and sizing the carbonized carbon fiber to create the carbon fiber product.

In some implementations, the carbon fiber product has a tensile strength of at least 100 MPa and a Young's modulus of at least 20 GPa.

In some implementations, the process further comprising separating insolubles from the solid asphaltene particulate product, wherein separating the insolubles comprises combining the solid asphaltene particulate product with an insolubles-producing solvent to produce the insolubles, and removing the insolubles from the solid asphaltene particulate product.

In some implementations, the insolubles-producing solvent is a saturated or unsaturated cyclic or heterocyclic hydrocarbon.

In some implementations, the insolubles-producing solvent is one or more of toluene, xylene, benzene, tetrahydrofuran, cyclohexanone, quinoline or pyridine.

In some implementations, conditioning comprises graphitization of the carbonized carbon fiber to form a graphitized carbon fiber, and surface treating and sizing the graphitized carbon fiber to create the carbon fiber product.

In some implementations, graphitization comprises heating the carbon fiber to over 3000° C. (5432° F.).

In some implementations, conditioning comprises graphitization of the carbonized carbon fiber to form a graphitized carbon fiber, activating the graphitized carbon fiber to form an activated carbon fiber, and then surface treating and sizing the activated carbon fiber to create the carbon fiber product.

In some implementations, the graphitized carbon fiber is activated by steam activation.

In some implementations, activation is performed at a steam temperature of about 800° C. to 900° C. and a steam rate of about 100 g/hr to about 200 g/hr.

In some implementations, the activated carbon fiber has a BET surface area of at least 500 $m^2$/g.

In some implementations, the activated carbon fiber has a BET surface area of at least 1000 $m^2$/g.

In some implementations, the carbon fiber product has a tensile strength of at least 1.5 GPa and a Young's modulus of at least 200 GPa.

In some implementations, the present technology relates to a system for producing a carbon fiber product from a heavy hydrocarbon feedstock comprising native asphaltenes, comprising:
  a solvent deasphalting separator configured to contact the heavy hydrocarbon feedstock stream comprising native asphaltenes with a solvent to precipitate asphaltenes and form solid asphaltene precipitates, the solvent deasphalting separator producing a solvent-diluted deasphalted oil stream comprising at least a portion of the solvent and a slurry stream comprising the asphaltene precipitates and residual solvent;

an inertial separation unit in fluid communication with the solvent deasphalting separator, the inertial separation unit being configured to separate the slurry stream solids to produce a solid asphaltene particulate product and a recovered solvent stream;

conversion units to treat the solid asphaltene particulate material and produce the carbon fiber product.

In some implementations, the heavy hydrocarbon feedstock comprises a bitumen-containing feedstock derived from a surface mining operation or an in situ extraction operation.

In some implementations, the solvent used in the solvent deasphalting separator comprises at least one $C_3$-$C_8$ hydrocarbon.

In some implementations, the solvent used in the solvent deasphalting separator comprises at least one $C_5$-$C_8$ hydrocarbon.

In some implementations, the solvent used in the solvent deasphalting separator comprises a mixture of $C_5$-$C_8$ hydrocarbons.

In some implementations, the solid asphaltene particulate material comprises 95 wt % or more C5+ asphaltenes.

In some implementations, the inertial separation unit is configured to vaporize the residual solvent to produce a vapour/solid mixture comprising vaporized solvent and the solid asphaltene precipitates, and to separate the vapour/solid mixture to recover the solid asphaltene particulate stream.

In some implementations, the conversion units comprise:
an extruding unit configured to extrude the solid asphaltene particulate material separated in the inertial separation unit, to produce extruded asphaltenes;
a spinning unit configured to melt spin the extruded asphaltenes into a continuous asphaltene thread;
a first heater configured to stabilize the asphaltene thread to produce a stabilized asphaltene thread;
a second heater configured to carbonize the stabilized asphaltene thread to produce a carbonized carbon fiber;
a surface and sizing treatment unit configured to surface treat and size the carbonized carbon fiber or a carbon fiber derived from the carbonized carbon fiber to produce the carbon fiber product.

In some implementations, the spinning unit comprises a melt spinning unit.

In some implementations, the first heater is operated at about 175° C. to about 290° C. (about 350° F. to about 550° F.) for up to 1 hour to stabilize the asphaltene thread.

In some implementations, the second heater is operated at about 995° C. to about 2000° C. (about 1823° F. to about 3632° F.) for up to 1 hour to carbonize the stabilized asphaltene thread.

In some implementations, the system further comprises an insolubles separation unit configured to contact the solid asphaltene particulate product with an insolubles-producing solvent and to separate the insolubles from the solid asphaltene particulate product.

In some implementations, the insolubles-producing solvent is a saturated or unsaturated cyclic or heterocyclic hydrocarbon.

In some implementations, the insolubles-producing solvent is one or more of toluene, xylene, benzene, tetrahydrofuran, cyclohexanone, quinoline or pyridine.

In some implementations, the system further comprises a graphitization unit after the second heater configured to heat the carbonized carbon fiber and produce the derived carbon fiber in the form of a graphitized carbon fiber.

In some implementations, the system further comprises:
a graphitization unit after the second heater configured to heat the carbonized carbon fiber and produce a graphitized carbon fiber, and
an activation unit configured to activate the graphitized carbon fiber and produce the derived carbon fiber in the form an activated carbon fiber.

In some implementations, the activation unit comprises a steam activation unit.

In some implementations, the steam activation unit is operated at a steam temperature of about 800° C. to about 900° C. and a steam rate of about 100 g/hr to about 200 g/hr.

In some implementations, the graphitization unit is operated at a temperature over 3000° C. (5432° F.).

In some implementations, the present technology further relates to a process for producing a carbon fiber product comprising:
extruding a solid asphaltene particulate product in the presence of a polymer to produce an extruded polymer-asphaltenes product;
treating the extruded polymer-asphaltenes product to generate the carbon fiber product.

In some implementations, the solid asphaltene particulate material comprises 95 wt % or more C5+ asphaltenes.

In some implementations, the polymer comprises a thermoplastic polymer.

In some implementations, the polymer comprises an acrylic, polyolefin, polyester, polystyrene, polyvinylchloride, or any mixture thereof.

In some implementations, the polymer comprises a polypropylene, polyethylene, polyvinylchloride, or any mixture thereof.

In some implementations, the solid asphaltene particulate material is obtained by:
solvent deasphalting a heavy hydrocarbon feedstock with a solvent to precipitate asphaltenes and form solid asphaltene precipitates and produce deasphalted oil;
separating the deasphalted oil from the solid asphaltene precipitates to produce a solvent-diluted deasphalted oil stream comprising at least a portion of the solvent and a slurry stream comprising the asphaltene precipitates and residual solvent;
separating the slurry stream to produce the solid asphaltene particulate material and a recovered solvent stream.

In some implementations, the heavy hydrocarbon feedstock comprises a bitumen-containing feedstock recovered from a surface mining operation or an in situ extraction operation.

In some implementations, the solvent used for the solvent deasphalting comprises at least one $C_3$-$C_8$ hydrocarbon.

In some implementations, the solvent used for the solvent deasphalting comprises at least one $C_5$-$C_8$ hydrocarbon.

In some implementations, the solvent used for the solvent deasphalting comprises a mixture of $C_5$-$C_8$ hydrocarbons.

In some implementations, separating the slurry stream comprises vaporizing the residual solvent to produce a vapour/solid mixture comprising vaporized solvent and the solid asphaltene precipitates, and subjecting the vapour/solid mixture to inertial separation.

In some implementations, treating the extruded polymer-asphaltenes product comprises:

spinning the extruded polymer-asphaltenes product into a continuous polymer-asphaltene thread;

heat treating the continuous polymer-asphaltene thread to produce a stabilized polymer-asphaltene thread;

carbonizing the stabilized polymer-asphaltene thread to produce a carbonized carbon fiber; and conditioning the carbonized carbon fiber to produce the carbon fiber product.

In some implementations, spinning comprises wet spinning.

In some implementations, heat treating is performed at about 175° C. to about 290° C. (about 350° F. to about 550° F.) for up to 1 hour.

In some implementations, carbonizing is performed at about 995° C. to about 2000° C. (about 1823° F. to about 3632° F.) for up to 1 hour.

In some implementations, conditioning comprises surface treating and sizing the carbonized carbon fiber to create the carbon fiber product.

In some implementations, the carbon fiber product has a tensile strength of at least 3.5 GPa and a Young's modulus of at least 250 GPa.

In some implementations, conditioning comprises graphitization of the carbonized carbon fiber to form a graphitized carbon fiber, and surface treating and sizing the graphitized carbon fiber to create the carbon fiber product.

In some implementations, graphitization comprises heating the carbon fiber to over 3000° C. (5432° F.).

In some implementations, conditioning comprises graphitization of the carbonized carbon fiber to form a graphitized carbon fiber, activating the graphitized carbon fiber to form an activated carbon fiber, and then surface treating and sizing the activated carbon fiber to create the carbon fiber product.

In some implementations, the graphitized carbon fiber is activated by steam activation.

In some implementations, activation is performed at a steam temperature of about 800° C. to about 900° C. and a steam rate of about 100 g/hr to about 200 g/hr.

In some implementations, the activated carbon fiber has a BET surface area of at least 500 m$^2$/g.

In some implementations, the activated carbon fiber has a BET surface area of at least 1000 m$^2$/g.

In some implementations, the carbon fiber product has a tensile strength of at least 3.5 GPa and a Young's modulus of at least 250 GPa.

In some implementations, the present technology also relates to system for producing a carbon fiber product comprising:

an extruding unit configured to extrude a solid asphaltene particulate product in the presence of a polymer to produce an extruded polymer-asphaltenes product;

conversion units to treat the extruded polymer-asphaltenes product and produce the carbon fiber product.

In some implementations, the extruding unit is provided with a mixer to blend the polymer and the solid asphaltene particulate product and an extruder to extrude the blend and produce the extruded polymer-asphaltenes product.

In some implementations, the system further comprises a mixing unit to blend the polymer and the solid asphaltene particulate upstream of the extruding unit.

In some implementations, the solid asphaltene particulate material comprises 95 wt % or more C5+ asphaltenes.

In some implementations, the polymer comprises a thermoplastic polymer.

In some implementations, the polymer comprises an acrylic, polyolefin, polyester, polystyrene, polyvinylchloride, or any mixture thereof.

In some implementations, the polymer comprises a polypropylene, polyethylene, polyvinylchloride, or any mixture thereof.

In some implementations, the system further comprises:

a solvent deasphalting separator configured to contact a heavy hydrocarbon feedstock stream with a solvent to precipitate asphaltenes and form solid asphaltene precipitates, the solvent deasphalting separator producing a solvent-diluted deasphalted oil stream comprising at least a portion of the solvent and a slurry stream comprising the asphaltene precipitates and residual solvent;

an inertial separation unit in fluid communication with the solvent deasphalting separator, the inertial separation unit being configured to separate the slurry stream solids to produce the solid asphaltene particulate material and a recovered solvent stream.

In some implementations, the heavy hydrocarbon feedstock comprises a bitumen-containing feedstock derived from a surface mining operation or an in situ extraction operation.

In some implementations, the solvent used in the solvent deasphalting separator comprises at least one $C_3$-$C_8$ hydrocarbon.

In some implementations, the solvent used in the solvent deasphalting separator comprises at least one $C_5$-$C_8$ hydrocarbon.

In some implementations, the solvent used in the solvent deasphalting separator comprises a mixture of $C_5$-$C_8$ hydrocarbons.

In some implementations, the inertial separation unit is configured to vaporize the residual solvent to produce a vapour/solid mixture comprising vaporized solvent and the solid asphaltene precipitates, and to separate the vapour/solid mixture to recover the solid asphaltene particulate material.

In some implementations, the conversion units comprise:

a spinning unit configured to melt spin the extruded polymer-asphaltenes product into a continuous polymer-asphaltene thread;

a first heater configured to stabilize the polymer-asphaltene thread to produce a stabilized polymer-asphaltene thread;

a second heater configured to carbonize the stabilized polymer-asphaltene thread to produce a carbonized carbon fiber;

a surface and sizing treatment unit configured to surface treat and size the carbonized carbon fiber or a carbon fiber derived from the carbonized carbon fiber to produce the carbon fiber product.

In some implementations, the spinning unit comprises a wet spinning unit.

In some implementations, the first heater is operated at about 175° C. to about 290° C. (about 350° F. to about 550° F.) for up to 1 hour to stabilize the asphaltene thread.

In some implementations, the second heater is operated at about 995° C. to about 2000° C. (about 1823° F. to about 3632° F.) for up to 1 hour to carbonize the stabilized asphaltene thread.

In some implementations, the system further comprises a graphitization unit after the second heater configured to heat the carbonized carbon fiber and produce the derived carbon fiber in the form of a graphitized carbon fiber.

In some implementations, the system further comprises:

a graphitization unit after the second heater configured to heat the carbonized carbon fiber and produce a graphitized carbon fiber, and an activation unit configured to activate the graphitized carbon fiber and produce the derived carbon fiber in the form of an activated carbon fiber.

In some implementations, the activation unit comprises a steam activation unit.

In some implementations, the steam activation unit is operated at a steam temperature of about 800° C. to about 900° C. and a steam rate of about 100 g/hr to about 200 g/hr.

In some implementations, the graphitization unit is operated at a temperature over 3000° C. (5432° F.).

In some implementations, the present technology further relates to a process for producing a carbon fiber product comprising:

adding at least one chemical agent to a solid asphaltene particulate material to produce a chemically treated asphaltene particulate product where the chemical agent comprises a Lewis acid, a reducing agent, an oxidizing agent or any mixture thereof;

converting the chemically treated asphaltene particulate product into the carbon fiber product.

In some implementations, addition of the chemical agent is performed under heating.

In some implementations, heating is performed at a temperature of about 140° C. to about 335° C.

In some implementations, addition of the chemical agent is combined with sparging.

In some implementations, addition of the chemical agent is combined with nitrogen sparging.

In some implementations, the chemical agent comprises one or more oxidizing agents.

In some implementations, the oxidizing agent is at least one compound comprising bromine, silver, chromium, manganese, and/or oxygen, or is a peroxide.

In some implementations, the chemical agent comprises $KMnO_4$, $H_2O_2$ or a combination thereof.

In some implementations, the chemical agent comprises a Lewis acid which is aluminum chloride, boron chloride, iron chloride, tin chloride, titanium chloride, aluminum bromide, boron bromide, iron bromide, tin bromide, titanium bromide, or any mixture thereof.

In some implementations, the chemical agent comprises one or more reducing agents.

In some implementations, the reducing agent is at least one compound comprising lithium, sodium, potassium, magnesium, aluminum, or zinc.

In some implementations, the chemical agent comprises one or more reducing agents selected from sodium hydroxide, potassium hydroxide, a molten sodium salt, a molten potassium salt, urea, $NaBH_4$, and any mixture thereof.

In some implementations, the solid asphaltene particulate material comprises 95 wt % or more C5+ asphaltenes.

In some implementations, the solid asphaltene particulate material is obtained by:

solvent deasphalting a heavy hydrocarbon feedstock with a solvent to precipitate asphaltenes and form solid asphaltene precipitates and produce deasphalted oil;

separating the deasphalted oil from the solid asphaltene precipitates to produce a solvent-diluted deasphalted oil stream comprising at least a portion of the solvent and a slurry stream comprising the asphaltene precipitates and residual solvent;

separating the slurry stream to produce the solid asphaltene particulate material and a recovered solvent stream.

In some implementations, the heavy hydrocarbon feedstock comprises a bitumen-containing feedstock recovered from a surface mining operation or an in situ extraction operation.

In some implementations, the solvent used for the solvent deasphalting comprises at least one $C_3$-$C_8$ hydrocarbon.

In some implementations, the solvent used for the solvent deasphalting comprises at least one $C_5$-$C_8$ hydrocarbon.

In some implementations, the solvent used for the solvent deasphalting comprises a mixture of $C_5$-$C_8$ hydrocarbons.

In some implementations, separating the slurry stream comprises vaporizing the residual solvent to produce a vapour/solid mixture comprising vaporized solvent and the solid asphaltene precipitates, and subjecting the vapour/solid mixture to inertial separation.

In some implementations, converting the treated asphaltene particulate product comprises:

extruding the treated asphaltene particulate product to produce extruded asphaltenes;

spinning the extruded asphaltenes into a continuous asphaltene thread;

carbonizing the asphaltene thread by heat treatment to produce a carbonized carbon fiber; and conditioning the carbonized carbon fiber to produce the carbon fiber product.

In some implementations, the process comprises stabilizing the asphaltene thread by heat treatment to produce a stabilized asphaltene thread and carbonizing the stabilized asphaltene thread to produce the carbonized carbon fiber.

In some implementations, the stabilizing heat treatment is performed at about 175° C. to about 290° C. (about 350° F. to about 550° F.) for up to 1 hour.

In some implementations, the carbonizing heat treatment is performed at about 995° C. to about 2000° C. (about 1823° F. to about 3632° F.) for up to 1 hour.

In some implementations, the process further comprises, before producing the extruded asphaltenes, a step of cleaning the treated asphaltene particulate product to remove undesirable solids and/or light hydrocarbons.

In some implementations, cleaning comprises filtering the undesirable solids, vacuum distillation to remove the light hydrocarbons and/or a secondary deasphalting.

In some implementations, the secondary deasphalting comprises deasphalting using a saturated or unsaturated cyclic or heterocyclic hydrocarbon solvent.

In some implementations, the saturated or unsaturated cyclic or heterocyclic hydrocarbon solvent is one or more of toluene, xylene, benzene, tetrahydrofuran, cyclohexanone, quinoline or pyridine.

In some implementations, the heterocyclic hydrocarbon solvent is tetrahydrofuran.

In some implementations, spinning comprises melt spinning.

In some implementations, conditioning comprises surface treating and sizing the carbonized carbon fiber to create the carbon fiber product.

In some implementations, the carbon fiber product has a tensile strength of at least 3 GPa and a Young's modulus of at least 400 GPa.

In some implementations, conditioning comprises graphitization of the carbonized carbon fiber to form a graphitized carbon fiber, and surface treating and sizing the graphitized carbon fiber to create the carbon fiber product.

In some implementations, graphitization comprises heating the carbon fiber to over 3000° C. (5432° F.).

In some implementations, the carbon fiber product has a tensile strength of at least 2.5 GPa and a Young's modulus of at least 500 GPa.

In some implementations, the present technology relates to a system for producing a carbon fiber product, comprising:
- a chemical treatment unit configured to treat a solid asphaltene particulate material with at least one chemical agent to produce a chemically treated asphaltene particulate product, where the chemical agent comprises a Lewis acid, a reducing agent, an oxidizing agent or any mixture thereof;
- conversion units to convert the chemically treated asphaltene particulate product into the carbon fiber product.

In some implementations, the chemical treatment unit is provided with a heating system to treat the solid asphaltene particulate stream with the chemical agent under heating.

In some implementations, the chemical treatment unit is configured to enable sparging when the solid asphaltene particulate stream is treated with the chemical agent.

In some implementations, the solid asphaltene particulate material comprises 95 wt % or more C5+ asphaltenes.

In some implementations, the chemical agent comprises one or more oxidizing agents.

In some implementations, the oxidizing agent is at least one compound comprising bromine, silver, chromium, manganese, and/or oxygen, or is a peroxide.

In some implementations, the chemical agent comprises $KMnO_4$, $H_2O_2$ or a combination thereof.

In some implementations, the chemical agent comprises a Lewis acid which is aluminum chloride, boron chloride, iron chloride, tin chloride, titanium chloride, aluminum bromide, boron bromide, iron bromide, tin bromide, titanium bromide, or any mixture thereof.

In some implementations, the chemical agent comprises one or more reducing agents.

In some implementations, the reducing agent is at least one compound comprising lithium, sodium, potassium, magnesium, aluminum, or zinc.

In some implementations, the chemical agent comprises one or more reducing agents selected from sodium hydroxide, potassium hydroxide, a molten sodium salt, a molten potassium salt, urea, $NaBH_4$, and any mixture thereof.

In some implementations, the system further comprises:
- a solvent deasphalting separator configured to contact a heavy hydrocarbon feedstock stream with a solvent to precipitate asphaltenes and form solid asphaltene precipitates, the solvent deasphalting separator producing a solvent-diluted deasphalted oil stream comprising at least a portion of the solvent and a slurry stream comprising the asphaltene precipitates and residual solvent;
- an inertial separation unit in fluid communication with the solvent deasphalting separator, the inertial separation unit being configured to separate the slurry stream solids to produce the solid asphaltene particulate material and a recovered solvent stream.

In some implementations, the heavy hydrocarbon feedstock comprises a bitumen-containing feedstock derived from a surface mining operation or an in situ extraction operation.

In some implementations, the solvent used in the solvent deasphalting separator comprises at least one $C_3$-$C_8$ hydrocarbon.

In some implementations, the solvent used in the solvent deasphalting separator comprises at least one $C_5$-$C_8$ hydrocarbon.

In some implementations, the solvent used in the solvent deasphalting separator comprises a mixture of $C_5$-$C_8$ hydrocarbons.

In some implementations, the inertial separation unit is configured to vaporize the residual solvent to produce a vapour/solid mixture comprising vaporized solvent and the solid asphaltene precipitates, and to separate the vapour/solid mixture to recover the solid asphaltene particulate material.

In some implementations, the conversion units comprise:
- an extruding unit configured to extrude the chemically treated asphaltene particulate product to produce extruded asphaltenes;
- a spinning unit configured to spin the extruded asphaltenes into a continuous asphaltene thread;
- a carbonization unit configured to carbonize the asphaltene thread to produce a carbonized carbon fiber;
- a surface and sizing treatment unit configured to surface treat and size the carbonized carbon fiber or a carbon fiber derived from the carbonized carbon fiber to produce the carbon fiber product.

In some implementations, the system further comprises a stabilization unit between the spinning unit and the carbonization unit configured to stabilize the asphaltene thread to produce a stabilized asphaltene thread and wherein the carbonization unit is configured to carbonize the stabilized asphaltene thread to produce the carbonized carbon fiber.

In some implementations, the stabilization unit is operated at about 175° C. to about 290° C. (about 350° F. to about 550° F.) for up to 1 hour to stabilize the asphaltene thread.

In some implementations, the carbonization unit is operated at about 995° C. to about 2000° C. (about 1823° F. to about 3632° F.) for up to 1 hour to carbonize the asphaltene thread.

In some implementations, the system further comprises a cleaning unit before the extrusion unit, configured to remove undesirable solids and/or light hydrocarbons from the treated asphaltene particulate stream.

In some implementations, the cleaning unit comprises a filter to remove the undesirable solids, a vacuum distillation to remove the light hydrocarbons and/or a secondary deasphalting unit.

In some implementations, the secondary deasphalting unit is operated with a saturated or unsaturated cyclic or heterocyclic hydrocarbon solvent.

In some implementations, the saturated or unsaturated cyclic or heterocyclic hydrocarbon solvent is one or more of toluene, xylene, benzene, tetrahydrofuran, cyclohexanone, quinoline or pyridine.

In some implementations, the heterocyclic hydrocarbon solvent is tetrahydrofuran.

In some implementations, the spinning unit comprises a melt spinning unit.

In some implementations, the system further comprises a graphitization unit after the carbonization unit configured to heat the carbonized carbon fiber and produce the derived carbon fiber in the form of a graphitized carbon fiber.

In some implementations, the graphitization unit is operated at a temperature over 3000° C. (5432° F.).

In some implementations, the present technology also relates to a process for producing an activated carbon fiber, comprising:

extruding a solid asphaltene particulate material to produce extruded asphaltenes;

spinning the extruded asphaltenes into a continuous asphaltene thread;

carbonizing the asphaltene thread by heat treatment to produce a carbonized carbon fiber;

activating the carbon fiber to produce an activated carbon fiber.

In some implementations, activating comprises steam activation.

In some implementations, steam activation is performed at a steam temperature of about 800° C. to about 900° C.

In some implementations, steam activation is performed at a steam rate of about 100 g/hr to about 200 g/hr.

In some implementations, the activated carbon fiber has a BET surface area of at least 500 m$^2$/g.

In some implementations, the activated carbon fiber has a BET surface area of at least 1000 m$^2$/g.

In some implementations, the carbonizing heat treatment is performed at about 995° C. to about 2000° C. (about 1823° F. to about 3632° F.) for up to 1 hour.

In some implementations, the process further comprises stabilizing the asphaltene thread by heat treatment to produce a stabilized asphaltene thread and carbonizing the stabilized asphaltene thread to produce the carbonized carbon fiber.

In some implementations, the stabilizing heat treatment is performed at about 175° C. to about 290° C. (about 350° F. to about 550° F.) for up to 1 hour.

In some implementations, the process further comprises graphitization of the carbonized carbon fiber to form a graphitized carbon fiber, and wherein activating comprises activating the graphitized carbon fiber to produce the activated carbon fiber.

In some implementations, graphitization comprises heating the carbonized carbon fiber to over 3000° C. (5432° F.).

In some implementations, the process further comprises:
thermally treating a heavy hydrocarbon feedstock to produce a lighter hydrocarbon stream and a heavier hydrocarbon stream;

solvent deasphalting the heavier hydrocarbon stream with a solvent to precipitate asphaltenes and form solid asphaltene precipitates and produce deasphalted oil;

separating the deasphalted oil from the solid asphaltene precipitates to produce a solvent-diluted deasphalted oil stream comprising at least a portion of the solvent and a slurry stream comprising the asphaltene precipitates and residual solvent;

separating the slurry stream to produce the solid asphaltene particulate material.

In some implementations, thermally treating the hydrocarbon feedstock is performed at a temperature ranging from about 370° C. (700° F.) to about 420° C. (790° F.) for a residence time ranging from 1 minute to 7 hours.

In some implementations, the hydrocarbon feedstock comprises a bitumen-containing feedstock derived from a surface mining operation or an in situ extraction operation.

In some implementations, the solvent used for the solvent deasphalting comprises at least one $C_3$-$C_8$ hydrocarbon.

In some implementations, the solvent used in the solvent deasphalting separator comprises at least one $C_5$-$C_8$ hydrocarbon.

In some implementations, the solvent used in the solvent deasphalting separator comprises a mixture of $C_5$-$C_8$ hydrocarbons.

In some implementations, separating the slurry stream comprises vaporizing the residual solvent to produce a vapour/solid mixture comprising vaporized solvent and the solid asphaltene precipitates, and subjecting the vapour/solid mixture to inertial separation.

In some implementations, the process further comprises separating insolubles from the solid asphaltene particulate material, wherein separating the insolubles comprises combining the solid asphaltene particulate material with an insolubles-producing solvent to produce the insolubles, and removing the insolubles from the solid asphaltene particulate material.

In some implementations, the insolubles-producing solvent is a saturated or unsaturated cyclic or heterocyclic hydrocarbon.

In some implementations, the insolubles-producing solvent is one or more of toluene, xylene, benzene, tetrahydrofuran, cyclohexanone, quinoline or pyridine.

In some implementations, the process further comprises surface treating and sizing the activated carbon fiber to create a carbon fiber product.

In some implementations, the carbon fiber product has a tensile strength of at least 1 GPa and a Young's modulus of at least 100 GPa.

In some implementations, the present technology further relates to a system for producing an activated carbon fiber, comprising:
an extruding unit configured to extrude a solid asphaltene particulate material to produce extruded asphaltenes;
a spinning unit configured to spin the extruded asphaltenes into a continuous asphaltene thread;
a carbonization unit configured to carbonize the asphaltene thread to produce a carbonized carbon fiber;
an activating unit configured to activate the carbon fiber and produce an activated carbon fiber.

In some implementations, the activation unit comprises a steam activation unit.

In some implementations, the steam activation unit is operated at a steam temperature of about 800° C. to about 900° C.

In some implementations, the steam activation unit is operated at a steam rate of about 100 g/hr to about 200 g/hr.

In some implementations, the carbonization unit is operated at about 995° C. to about 2000° C. (about 1823° F. to about 3632° F.) for up to 1 hour.

In some implementations, the system further comprises a stabilization unit before the carbonization unit configured to stabilize the asphaltene thread by heat treatment to produce a stabilized asphaltene thread.

In some implementations, the stabilizing unit is operated at about 175° C. to about 290° C. (about 350° F. to about 550° F.) for up to 1 hour.

In some implementations, the system further comprises a graphitization unit configured to heat the carbonized carbon fiber and produce a graphitized carbon fiber, and wherein the graphitized carbon fiber is activated into the activation unit.

In some implementations, the graphitization unit is operated at a temperature over 3000° C. (5432° F.).

In some implementations, the system further comprises:
a thermal reactor configured to receive a heavy hydrocarbon feedstock and produce a lighter hydrocarbon stream and a heavier hydrocarbon stream;
a solvent deasphalting separator in fluid communication with the thermal reactor and configured to contact the heavier hydrocarbon stream with a solvent to precipitate asphaltenes and form solid asphaltene precipitates, the solvent deasphalting separator producing a solvent-diluted deasphalted oil stream comprising at least a portion of the solvent and a slurry stream comprising the asphaltene precipitates and residual solvent;

an inertial separation unit in fluid communication with the solvent deasphalting separator, the inertial separation unit being configured to separate the slurry stream solids to produce the solid asphaltene particulate material and a recovered solvent stream;

In some implementations, the thermal reactor is configured to operate at a temperature about 370° C. (700° F.) to about 420° C. (790° F.) for a residence time ranging from 1 minute to 7 hours.

In some implementations, the heavy hydrocarbon feedstock comprises a bitumen-containing feedstock derived from a surface mining operation or an in situ extraction operation.

In some implementations, the solvent used in the solvent deasphalting separator comprises at least one of $C_3$-$C_8$ hydrocarbon.

In some implementations, the solvent used in the solvent deasphalting separator comprises at least one $C_5$-$C_8$ hydrocarbon.

In some implementations, the solvent used in the solvent deasphalting separator comprises a mixture of $C_5$-$C_8$ hydrocarbons.

In some implementations, the inertial separation unit is configured to vaporize the residual solvent to produce a vapour/solid mixture comprising vaporized solvent and the solid asphaltene precipitates, and to separate the vapour/solid mixture to recover the solid asphaltene particulate stream.

In some implementations, the system further comprises an insolubles separation unit configured to contact the solid asphaltene particulate material with an insolubles-producing solvent and to separate the insolubles from the solid asphaltene particulate material.

In some implementations, the insolubles-producing solvent is a saturated or unsaturated cyclic or heterocyclic hydrocarbon.

In some implementations, the insolubles-producing solvent is one or more of toluene, xylene, benzene, tetrahydrofuran, cyclohexanone, quinoline or pyridine.

In some implementations, the system further comprises a surface and sizing treatment unit configured to surface treat and size the activated carbon fiber to produce a carbon fiber product.

In some implementations, the carbon fiber product has a tensile strength of at least 1 GPa and a Young's modulus of at least 100 GPa.

DETAILED DESCRIPTION

Figure 1:
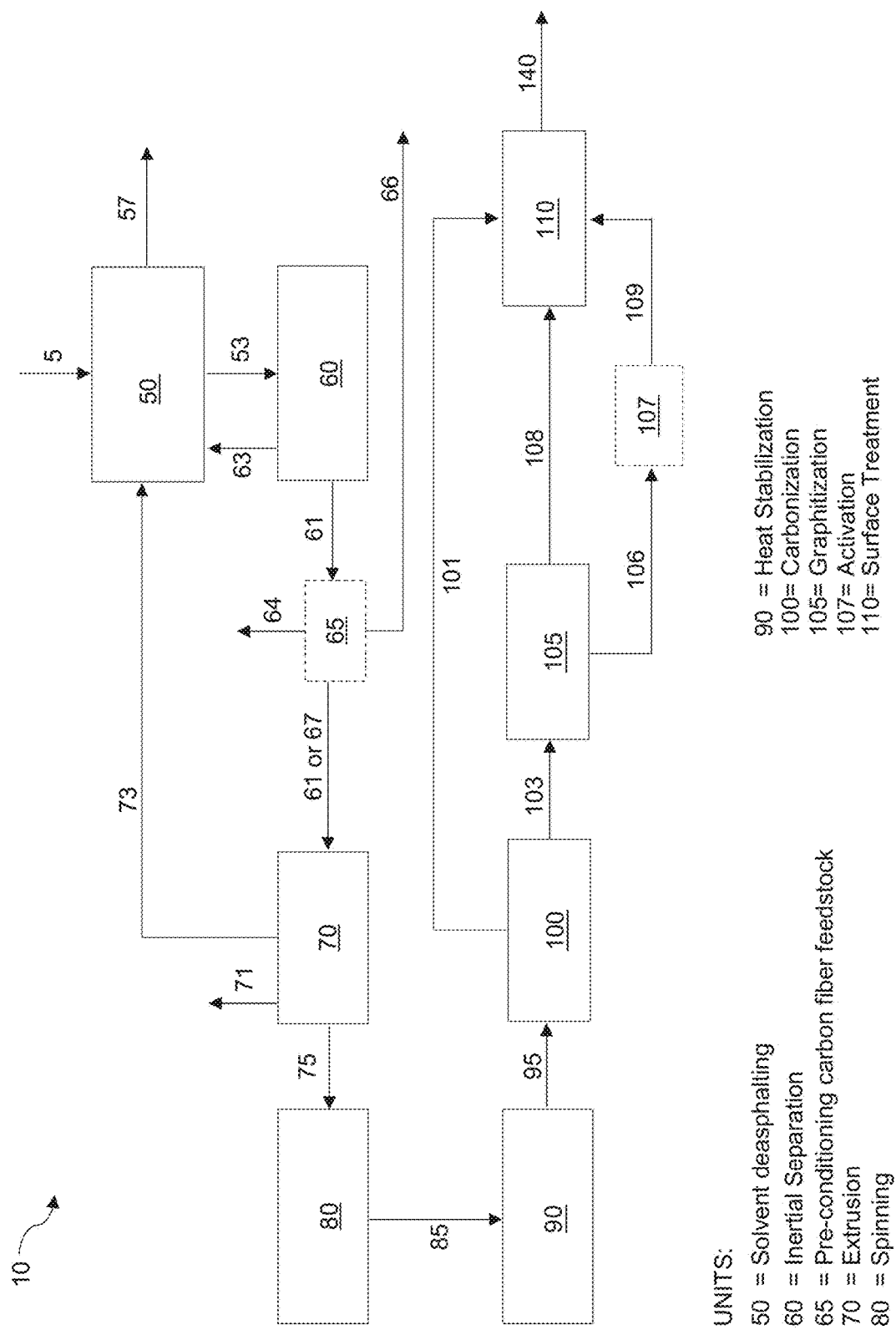
FIG. 1 represents a flow diagram of the process for obtaining a carbon fiber from a heavy hydrocarbon feedstock according to a first implementation.

The present technology relates to a process for obtaining a carbon fiber product from a heavy hydrocarbon feedstock containing asphaltenes involving various asphaltene treatments to arrive at the final carbon fiber product. In some implementations, the treatments can include addition of polymers or chemical agents at certain steps of the process to allow obtaining a variety of carbon fiber products. Other treatments can involve an activation step whereby an activated carbon fiber can be produced. Depending on the treatment(s) to which are subjected the asphaltenes, one can obtain general purpose carbon fibers, mid-performance carbon fibers, or high-performance carbon fibers, as will be detailed below.

Definitions

All technical and scientific terms used herein have the same meaning as commonly understood by one ordinary skilled in the art to which the present technology pertains. For convenience, the meaning of certain terms and phrases used herein are provided below.

To the extent the definitions of terms in the publications, patents, and patent applications incorporated herein by reference are contrary to the definitions set forth in this specification, the definitions in this specification control.

The terminology used herein is for the purpose of describing particular implementations only and is not intended to be limiting. It should be noted that, the singular forms "a", "an", and "the" include plural forms as well, unless the content clearly dictates otherwise. To the extent that the terms "including", "includes", "having", "has", "with", or variants thereof are used in either the detailed description and/or the claims, such terms are intended to be inclusive in a manner similar to the term "comprising".

The term "about" means within an acceptable error range for the particular value as determined by one of ordinary skill in the art, which will depend in part on how the value is measured or determined, i.e., the limitations of the measurement system. For example, "about" can mean within 1 or more than 1 standard deviation, per the practice in the art. Alternatively, "about" can mean a range of up to 20%, preferably up to 10%, more preferably up to 5%, and more preferably still up to 1% of a given value. Alternatively, particularly with respect to biological systems or processes, the term can mean within an order of magnitude, preferably within 5-fold, and more preferably within 2-fold, of a value. Where particular values are described in the application and claims, unless otherwise stated the term "about" meaning within an acceptable error range for the particular value should be assumed.

Carbon fiber—Fiber containing at least 92 wt % carbon. The carbon fiber that can be produced according to the present process can be any carbon fiber from the main four classes of carbon fibers as classified according to the tensile modulus of the fiber:

standard modulus carbon fiber (at least 92 wt % carbon)
intermediate modulus carbon fiber (92-95 wt % carbon)
high modulus carbon fiber (95-99 wt % carbon)
ultrahigh modulus carbon fiber (99 wt % and more carbon) that includes graphite fiber.

General purpose carbon fiber—Carbon fibers that have relatively low tensile strength (less than 1 GPa) and low Young's modulus (less than 100 GPa) respectively. Isotropic-pitch-based carbon fibers belong to this grade and are used in applications that benefit from their low weight and bulkiness, e.g., thermal insulation for a high-temperature furnace, cement reinforcement and activated carbon fiber applications.

Mid-performance carbon fiber—Carbon fibers that nominally have tensile strength in the range from 1 to 2.5 GPa and Young's modulus in the range from 100 to 500 GPa.

High-performance carbon fiber—Carbon fibers that have at least one of relatively high tensile strength and high Young's modulus. For instance, a high-performance carbon fiber can present a tensile strength greater than 2.5 GPa with a Young's modulus around 200 to 300 GPa or can present a high Young's modulus, i.e., greater than 500 GPa with a tensile strength in the range 2.5-4.5 GPa. This quality of carbon fiber is anisotropic in nature due to presence of mesophase material.

Graphene—Graphene is an atomic-scale hexagonal lattice made of a single layer of carbon atoms. It is the basic structural element of many other allotropes of carbon, such as graphite, diamond, charcoal, carbon nanotubes and fullerenes.

Insolubles—Material that precipitates into or remains in the solid form when mixed with a solvent.

Mesophase—A phase of matter intermediate between a liquid and solid, referred to as liquid crystals.

Non-Newtonian fluid—A fluid having a viscosity (the gradual deformation by shear or tensile stresses) dependent on shear rate or shear rate history. A Non-Newtonian fluid's viscosity can change when under force to either more liquid or more solid.

Pipelineable crude—Heavy hydrocarbon with API less than or equal to 19 (density >920 kg/m$^3$), and/or more than 300 cst that requires some processing to meet pipeline specifications of greater than API 19 (density <920 kg/m$^3$), viscosity less than 300 cSt at reference temperature, sediment and water less than 0.4 wt % and olefins less than 1 wt % or non-detectable by the measurement tool used by the transporter.

Tensile strength—Measure of the amount of force with which a fiber can be pulled before it breaks.

Young's modulus—Measure of a material's stiffness defined as the axial stress divided by the axial strain. The higher the modulus, the stiffer the material (i.e., the greater the stress necessary to cause deformation).

BET surface area—Surface area measured according to the Brunauer-Emmett-Teller (BET) principle involving physical adsorption of gas molecules (generally nitrogen gas $N_2$) on a solid surface.

Some implementations of the process will now be described by referring to the Figures.

FIG. 1 represents a process 10 for preparing a carbon fiber product 140 from a heavy hydrocarbon feedstock 5, involving various treatment steps that will be detailed below. In some implementations, the heavy hydrocarbon feedstock 5 can include a bitumen-containing feedstock derived from a surface mining operation or an in situ extraction operation. In some implementations, the heavy hydrocarbon feedstock can derive from a SAGD (steam assisted gravity drainage) process. In other implementations, the heavy hydrocarbon feedstock can derive from a solvent-based or solvent-enhanced in situ hydrocarbon recovery process.

In the present description, reference is made to "heavy hydrocarbon feedstock" as the product that is used for preparing the carbon fiber according to the present technology. It is to be noted that the process described herein can be implemented with any type of heavy hydrocarbon-containing feedstock (also referred to as "heavy oil feedstock") recovered from a subsurface extraction operation or from a surface mining process or can be a feedstock derived from the recovered heavy oil. The feedstock derived from the recovered heavy oil can include any product that is obtained downstream of extraction, which contains asphaltenes. In some implementations, the heavy hydrocarbon feedstock can include bitumen (e.g., from oil sands). In some implementations, the techniques described herein can employ a bitumen product, atmospheric bottoms or vacuum tower bottoms.

In some implementations, the heavy hydrocarbon feedstock can include both heavy and light hydrocarbon fractions. The heavy hydrocarbon feedstock includes asphaltenes. In some implementations, the heavy hydrocarbon feedstock includes "native" asphaltenes, meaning that the asphaltenes in the feedstock are substantially asphaltenes in the form that were in the ground before extraction therefrom. In some implementations, "native" asphaltenes thus includes any asphaltenes that have not been heated or converted chemically and/or thermally. One can also refer to "unspoiled" asphaltenes. In some implementations, the heavy hydrocarbon feedstock can include a low mineral solids content. In other implementations, the heavy hydrocarbon feedstock can include higher mineral solids and/or solid particles content. The bitumen feedstock can include various non-hydrocarbon compounds (e.g., sulfur, heavy metals, etc.) that are often found in bitumen and may be associated with certain fractions or solubility classes of bitumen. It should also be noted that the bitumen feedstock can in some cases be a blend of different hydrocarbon streams.

Returning to the implementations presented in FIG. 1, the heavy hydrocarbon feedstock stream 5 is directly sent to a solvent deasphalting apparatus (SDA) 50 where the heavy hydrocarbon feedstock stream is contacted with a deasphalting solvent 63 to precipitate asphaltenes from the feedstock and produce a solvent-diluted deasphalted oil stream 57 and a solid asphaltene precipitates-containing stream 53, which also contains residual solvent. The solvent-diluted deasphalted oil 57 can be sent to a separate treatment plant for being upgraded, such as a Fluid Catalytic Cracking Unit (FCCU) for instance (not shown in the figure) or any other upgrading facility (e.g., using ionic liquids). An example of a solid-liquid solvent separation process and system that can be used for step 50 can include the one described in U.S. Pat. No. 9,976,093 and Canadian patent 2,844,000 which are herein incorporated by reference. The deasphalting solvent can include any known solvent capable of precipitating asphaltenes from a heavy hydrocarbon feedstock. In some implementations, the deasphalting solvent can be a pure hydrocarbon component in the range of $C_3$ to $C_8$. Hence, in some implementations, the deasphalting solvent can include propane, butane or a mixture thereof. In some implementations, a pure hydrocarbon component in the range of $C_3$ to $C_8$ can be used as the deasphalting solvent. In other implementations, the deasphalting solvent can be a mixture of $C_3$ to $C_8$ hydrocarbons, or a mixture of $C_5$ to $C_8$ hydrocarbons, e.g., extracted from readily available natural gas condensate or diluent that comes in with the heavy crude feed. In some implementations, the SDA can be operated to reject as much non-asphaltene crude as possible, creating a 95 wt % or more concentrated C5+ asphaltene stream that can be processed in the next steps to obtain the final carbon fiber product. In some implementations, operating the SDA to obtain such a concentrated C5+ asphaltene stream can allow minimizing the downstream process steps required for removing remaining non-asphaltene molecules from the crude feedstock. CA 2,844,000 mentioned above describes conditions that can be used for operating the SDA.

Stream 53 exiting the SDA 50 can be in the form of a slurry containing entrained solid asphaltene precipitates in a solvent liquid phase. In some implementations, stream 53 can be reduced in pressure to flash the solvent to create a vapor/solid mixture as a slurry or suspension before entering the inertial separation unit (ISU) 60, where a solid/vapour separation can then be performed. In the ISU 60, the solvent vapour is condensed and can be returned to the SDA 50 as recovered solvent stream 63, which can then be reused in the SDA 50. Although, FIG. 1 only shows that deasphalting solvent is provided to the SDA 50 as recovered stream 63, make-up deasphalting solvent can further be provided to the SDA, as required. In ISU 60, the slurry stream 53 is thus separated to produce a solid asphaltene particulate stream 61 that can be further processed in various steps to obtain the final carbon fiber product 140.

In some implementations, the solid asphaltene particulate stream 61 can be directly sent to the next process step, which includes extrusion of the solid asphaltene particulate material in unit 80. In an optional implementation, the solid asphaltene particulate stream 61 exiting the ISU 60, can be further treated in unit 65 before the next extrusion step. Hence, in some implementations, the process can involve sending the solid asphaltene particulate stream 61 to unit 65 where a further treatment is performed to separate any undesirable solids (also referred to as "insolubles") that hinder the generation of carbon fiber, from the solid asphaltene particulate stream 61. The undesirable solids can be removed as stream 64 and a cleaner asphaltene particulate-containing stream 67 can be produced. The undesirable solids that are removed in unit 65 can contain various solid particles, inorganic material, and/or dirt that was present in the feedstock. In some implementations, unit 65 can contain a second solvent deasphalting step using organic solvents that adsorb heavier molecules than the solvent that is used in the SDA 50. The solvents that can be used to reject the heaviest, most undesirable solids in the solid asphaltene particulate stream 61 can include saturated or unsaturated cyclic or heterocyclic hydrocarbon based compounds, such as toluene, xylene, benzene, tetrahydrofuran, cyclohexanone, quinoline and pyridine among others. In some implementations, vacuum distillation can also be used in unit 65, alone or in combination with the second deasphalting step, to remove any remaining lighter molecules that could create voids in the carbon fiber. Any lighter material evolved in the vacuum distillation or similar process, including the saturated or unsaturated cyclic or heterocyclic hydrocarbon based solvent, will end up as stream 66. In addition, sparging can be considered within unit 65 to produce more mesophase material by removing lighter components and altering the orientation of the carbon molecules to promote high-performance carbon fiber in stream 140. Sparging is a process similar to air blowing, and for carbon fiber, sparging is generally conducted with inert nitrogen instead of air.

The solid asphaltene particulate stream 61 or 67 can then enter an extruder 70 where pressure can be applied to the solid asphaltenes to remove any remaining entrained solvent. In some implementations, the solid asphaltene particulate stream 61 or 67 can be submitted to a crushing step before extrusion in extruder 70 (not shown in the Figures). Crushing can be performed in a regular breaker, rotary breaker, or a direct-drive crusher. In some implementations, crushing can be performed to obtain small particulate size, which can then promote interaction with any additives that may be used in the process. With smaller particle size, any additive used can surround the particles readily. In some implementations, crushing can result in solid asphaltene particles of size in the range from about 10 µm to about 100 µm. In some implementations, a crusher is used before the extruder, but it could also be possible, in some implementations, to just have a crusher to grind up solid asphaltenes fine enough for the next spinning treatment step.

In some implementations, the extruder 70 is heated to a temperature in the 200-350° C. range to create conditions to provide continuous flow as a Non-Newtonian fluid through and out of the equipment. The solvent removed in unit 70 can be returned to the SDA unit as stream 73. Some of the generated asphaltene extrudate can be segregated and sent to the solid fuels market, as stream 71, if the market for carbon fiber is saturated or not economic. In another implementation, material in stream 71 can be sent for processing to become activated carbon. The majority of the extruded asphaltenes can leave the extruding unit 70 as stream 75. In the next step, the extruded material can be treated in a spinning unit 80, where "green" carbon fiber can be produced as stream 85. In some implementations, a single unit can be used wherein extrusion and spinning can be performed. "Green" carbon fiber is a term used for hydrocarbon crude derived fiber that has yet to be oxidized or carbonized. Green carbon fiber can be extremely fragile. The spinning of the extruded asphaltenes resulting in the "green" carbon fiber can be accomplished by either melt, wet or jet spinning. In some implementations, melt spinning is preferably used. After spinning, the green fiber made of a continuous asphaltene thread can have a diameter that is less than 25 µm, or less than 20 µm, or even less than 15 µm. In some implementations, the diameter of the green fiber can be less than 10 µm.

Then, the continuous asphaltene thread or "green" fiber 85, can be stabilized in unit 90. In some implementations, stabilization can be accomplished by heating. For instance, the green fibers can be heated in a forced air environment to provide sufficient fresh oxygen to the fiber surfaces. In some implementations, the stabilizing heat treatment can be performed at temperatures in the range of about 200 to about 300° C. Heating causes the spun fibers/threads to pick up oxygen molecules on their surfaces to prevent the onset of inter-fiber coalescence or melting and to promote good carbon yield in the following carbonization step. Stabilization can take between a few minutes up to an hour or two. In some implementations, the stabilizing heat treatment can be performed at about 175° C. to about 290° C. (about 350° F. to about 550° F.) for up to 1 hour.

The stabilized fiber/thread exits the stabilizing unit 90 as stream 95, and can then be subjected to carbonization in unit 100. Carbonization can be performed under an inert environment (no oxygen) by heating the stabilized fiber uniformly up to approximately 1000° C. In some implementations, the carbonization can be performed at higher temperatures and up to about 2000° C., to improve both the fiber strength and Young's modulus. The carbonizing step can take between a minute to up to an hour or two depending on the desired final properties. In some implementations, the carbonizing heat treatment can be performed at about 995° C. to about 2000° C. (about 1823° F. to about 3632° F.) for up to 1 hour. Performing the carbonization under an inert environment, i.e., without oxygen, can prevent the fibers from burning in the very high temperatures. As the fibers are heated, they can begin to lose their non-carbon atoms, plus a few carbon atoms, in the form of various gases including water vapor, ammonia, carbon monoxide, carbon dioxide, hydrogen, nitrogen, sulfur, evolved metals such as nickel and vanadium and others. As the non-carbon atoms are expelled, the remaining carbon atoms can form tightly bonded carbon crystals that are aligned more or less parallel to the long axis of the fiber. In other implementations, the carbonization can be performed using two furnaces operating at two different temperatures to better control the rate of heating during carbonization.

The carbonized fiber that leaves the carbonization unit 100 can then be subjected to various treatments to produce the final carbon fiber product 140.

In one implementation, the carbonized fiber stream 101 exiting unit 100 can directly be sent to a surface treatment and sizing in unit 110. Surface treatment and sizing methods that can be used can include acid oxidation, resin addition, plasma treatment, rare earth treatment, and/or gamma irradiation. Surface treatment can lead to improved composite properties due to the conditions of improved surface area of the fiber surface, chemical bonding and adhesion between fiber and matrix. Surface treating and sizing is typically used, since after carbonizing, the fibers have a surface that does not bond well with epoxies and other materials used in composite materials. To give the fibers better bonding properties, their surface can be slightly oxidized. The addition of oxygen atoms to the surface can provide better chemical bonding properties and also can etch and roughen the surface for better mechanical bonding properties. Oxidation can be achieved by immersing the fibers in various gases such as air, carbon dioxide, or ozone; or in various liquids such as sodium hypochlorite or nitric acid. The fibers can also be coated electrolytically by making the fibers the positive terminal in a bath filled with various electrically conductive materials. The surface treatment process can be controlled to avoid forming tiny surface defects, such as pits, which could cause fiber failure. In some implementations, the fibers are surface treated and then coated (sizing step) to protect them from damage during winding or weaving. Coating materials are chosen to be compatible with the adhesive used to form composite materials. Typical coating materials include epoxy, polyester, nylon, urethane, and others. The coated fibers are wound onto cylinders called bobbins. The bobbins are loaded into a spinning machine and the fibers are twisted into yarns of various sizes. It can be noted that when the process is performed without the upstream treatment in unit 65, the final carbon fiber product stream 140 can include a general purpose (GP) carbon fiber. Such a general purpose carbon fiber can have a tensile strength of at least 100 MPa and a Young's modulus of at least 20 GPa. In other implementations, the general purpose carbon fiber can have a tensile strength of at least 150 MPa and a Young's modulus of at least 20 GPa. However, if the overall process is performed with the upstream treatment in unit 65, the resulting carbon fiber product stream 140 can be a carbon fiber with increased performance, such as a mid- or high-performance carbon fiber.

In another implementation, the carbonized fiber exiting unit 100 can be subjected to additional treatments before being sent to the surface treatment and sizing unit 110, as also shown in FIG. 1. For instance, the carbonized fiber stream 103 can be sent to a graphitization unit 105 where the carbon fibers are graphitized at temperatures close to 3000° C. or over, in a non-oxygen environment, to further improve their Young's modulus. This step can create mid- and/or high-performance carbon fibers with tensile strength that can be between 1-2.5 GPa for mid-performance and above 2.5 GPa for high-performance carbon fiber and Young's modulus between 100-500 GPa for mid-performance and above 200 GPa for high-performance carbon fiber. The graphitized material leaving unit 105 as stream 108 can produce a high-performance carbon fiber stream 140, after surface treatment is performed in unit 110. In another implementation, the graphitized material can leave unit 105 as stream 106 and be sent to an activation unit 107 before the final surface and sizing treatment. In unit 107, the graphitized carbon fiber can thus be treated to create an activated carbon fiber 109 to provide additional properties to the final carbon fiber product 140. In some implementations, activation can be performed with steam. Hence, steam can be introduced into the activation chamber where it can interact with the carbon fiber. In some implementations, activation with steam can be performed for up to about 1 hour, and usually for a maximum of about 2 hours. In some implementations, activation can be performed at a steam temperature of about 800° C. to about 900° C. and a steam rate of about 100 g/hr to about 200 g/hr. In some implementations, the residence time in the activation unit can be from about 30 minutes to about 2 hours, or from about 30 minutes to about 90 minutes or from about 30 minutes to about 1 hour or from about 1 hour to about 90 minutes. In some implementations, the residence time in the activation unit can be about 1 hour. Creating an activated carbon fiber can be interesting compared to an activated carbon powder or briquette for some applications. For instance, an activated carbon fiber can be molded to a desired shape for a specific application. Molded activated carbon fiber pieces can be used to produce all-in-one filters, while a housing is required for filters using activated carbon powder. Producing activated carbon fibers can thus open opportunities at least for carbon-based filters. In some implementations, the activated carbon fiber can present a BET surface area of at least 500 $m^2/g$, or a BET surface area of at least 1000 $m^2/g$ in some implementations. The activated carbon fiber stream 109 leaving unit 107 can then be surface treated in unit 110 as explained above. The resulting activated carbon fiber product 140 can thus combine high performance and activation properties.

Figure 2:
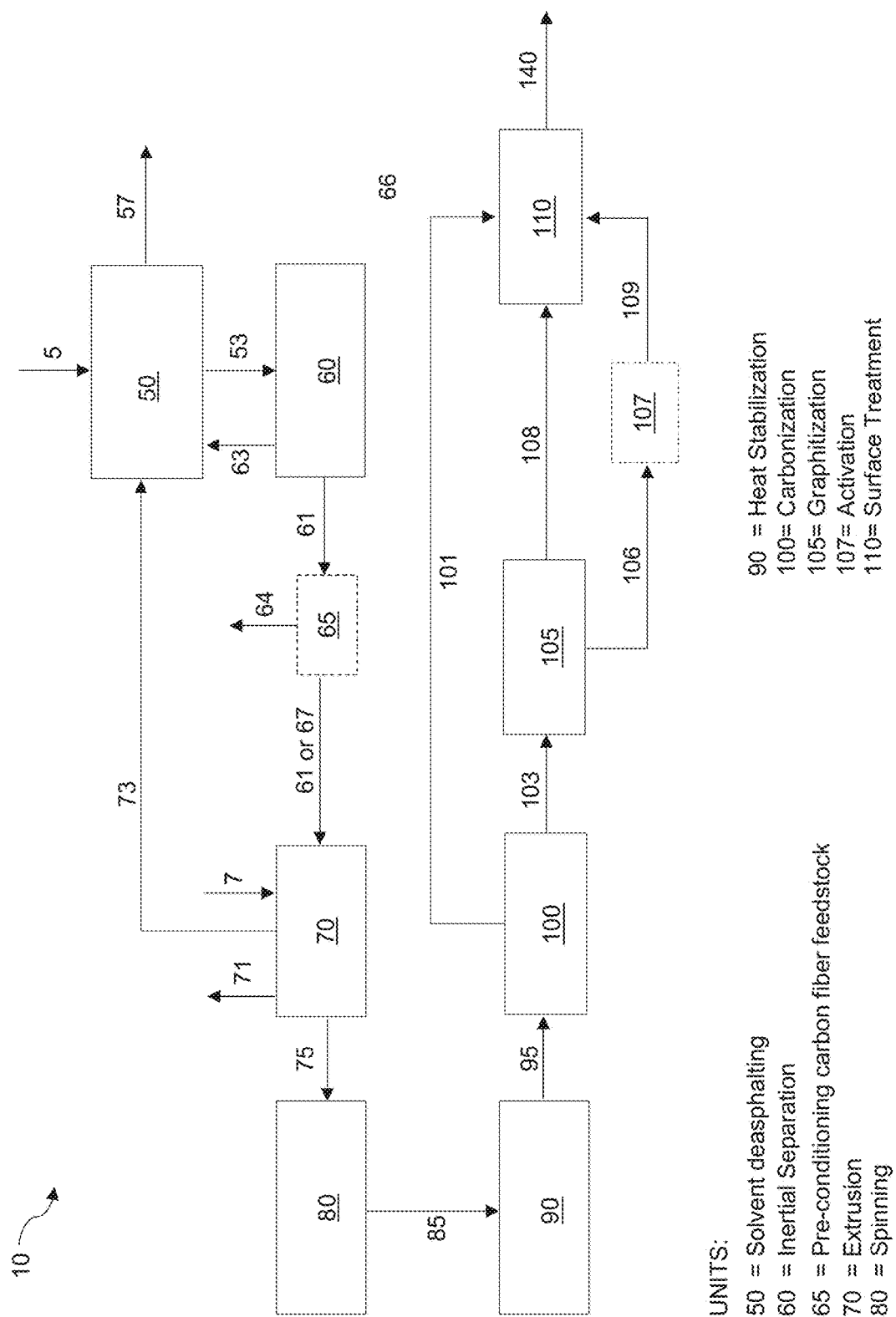
FIG. 2 represents a flow diagram of the process for obtaining a carbon fiber from a heavy hydrocarbon feedstock according to another implementation.

Another implementation of the present technology is shown in FIG. 2. In this implementation, a polymer is combined with the solid asphaltene particulate stream 61 at the extrusion step 70 as will be detailed below. The heavy hydrocarbon feedstock stream 5 containing native asphaltenes is sent to the SDA 50 where the heavy hydrocarbon feedstock stream is contacted with a deasphalting solvent 63 to precipitate asphaltenes from the feedstock and produce the solvent-diluted deasphalted oil stream 57 and the solid asphaltene precipitates-containing stream 53, which can also contain residual solvent. The deasphalting solvent is as described above and can include any known solvent capable of precipitating asphaltenes from a heavy hydrocarbon feedstock. In some implementations, the deasphalting solvent can be a pure hydrocarbon component in the range of $C_3$ to $C_8$, preferably in the range $C_5$ to $C_8$. In some implementations, the deasphalting solvent can be a mixture of $C_3$ to $C_8$ hydrocarbons, preferably a mixture of $C_5$ to $C_8$ hydrocarbons, e.g., extracted from readily available natural gas condensate or diluent that comes in with the heavy crude feed.

In some implementations, stream 53 exiting the SDA 50, which is in the form of a slurry containing entrained solid asphaltene precipitates in a solvent liquid phase, can be reduced in pressure to flash the solvent to create a vapor/solid mixture as a slurry or suspension before entering the ISU 60, where a solid/vapour separation can then be performed. In the ISU 60, the solvent vapour is condensed and can be returned to the SDA 50 as recovered solvent stream 63, which can then be reused in the SDA 50. Although FIG. 2 only shows that deasphalting solvent is provided to the SDA 50 as recovered stream 63, make-up deasphalting solvent can also be provided to the SDA, as required. In ISU 60, the slurry stream 53 is thus separated to produce a solid asphaltene particulate stream 61 that can be further processed in downstream steps to obtain the final carbon fiber product 140.

In some implementations, the solid asphaltene particulate stream 61 is directly sent to the next process step, which includes extrusion of the solid asphaltene particulate material in unit 80 in the presence of at least one polymer 7. However, other implementations, stream 61 could be further treated in unit 65 to obtain stream 67, as described with reference to FIG. 1 above. If this latter step is implemented, then asphaltene particulate-containing stream 67 is sent to the extrusion unit 70 to be extruded in the presence of polymer 7. Addition of a polymer at the extrusion step can allow to improve the modulus properties of the final carbon fiber product and also improve its impact resistance, while still retaining tensile strength. In some implementations, one can thus obtain carbon fibers that can compete with polyacrylonitrile (PAN) based carbon fibers, but also other materials such as steel and aluminum, for instance. In some implementations, the polymer material 7 can be a single polymer (including a copolymer) or a mixture of polymers (which can be homopolymer and/or copolymers). In some implementations, the polymer is at least one thermoplastic polymer. Examples of polymers that can be combined with the solid asphaltene particulate stream 61 can include acrylic-based polymers, polyolefins, polyesters, polystyrenes, polyvinylchlorides, and any mixtures thereof. In some implementations, the polymer 7 can be combined with the solid asphaltene particulate stream 61 in solid form. In some implementations, a mixing unit (not shown in FIG. 2) can be used upstream of extrusion unit 70 to prepare a mixture of polymer-solid asphaltene particulates and then the mixture is sent to extrusion. In some implementations, the polymer and the solid asphaltene particulates can be mixed directly at the extrusion step. In further implementations, a crushing step can be carried out before extrusion to obtain particles of both the asphaltenes particulate and polymer of desired size for being extruded. In some implementations, the polymer can be used in an amount to allow generation of a "green" carbon fiber containing from about 30 wt % to about 70 wt % of polymer. In some implementations, the amount of polymer is as low as possible in order to retain a suitable tensile strength in the final carbon fiber product. In some implementations, the polymer can be used in an amount to allow generation of a "green" carbon fiber containing from about 30 wt % to about 60 wt % of polymer, or from about 30 wt % to about 50 wt %, or from about 30 wt % to about 40 wt %. However, larger or smaller amounts can be used. One can select the content of polymer to be used as well as the nature of the polymer based on the desired properties for the final carbon fiber product. In extrusion unit 70, pressure can be applied to the mixture polymer-solid asphaltenes to remove any remaining entrained solvent. In some implementations, the extruder 70 can be heated to a temperature in the range of about 150° C. to about 350° C. In some implementations, the extruder can be heated at a temperature in the range of about 200° C. to about 350° C. In some implementations, the extruder can be heated to a temperature in the range from about 150° C. to about 300° C. The temperature can be adapted depending on the nature of the polymer being used and/or based on its melting point for instance. Heating can allow creation of conditions that provide for continuous flow as a Non-Newtonian fluid through and out of the equipment. The solvent removed in unit 70 can be returned to the SDA unit as stream 73. Some of the excess asphaltene extrudate can be directed to the solid fuels market, as stream 71, if the demand for polymer carbon fiber is slow. The extruded material containing polymer and asphaltenes leave the extruding unit 70, as stream 75. In the next step, the extruded material can be treated in the spinning unit 80, where "green" carbon fiber can be produced as stream 85. It is to be noted that in some implementations, extrusion and spinning can be performed in a single unit. The spinning of the extruded polymer-asphaltenes material resulting in the "green" carbon fiber can be accomplished by wet, jet or melt spinning. In some implementations, wet spinning is used to avoid or limit polymer decomposition or degradation that could be observed with melt spinning. After spinning, the green fiber made of a continuous polymer-asphaltene thread can have a diameter that is less than 15 µm. In some implementations, the diameter of the green fiber can be less than 10 µm. Then, the continuous polymer-asphaltene thread or "green" fiber 85 can be further processed as explain above with respect to FIG. 1, to obtain the final carbon fiber product 140. Hence, the continuous polymer-asphaltene thread 85 can at least be heat stabilized/oxidized in unit 90 to form a stabilized polymer-asphaltene stream 95, which can itself be carbonized in unit 100, and then, the carbonized material 101 can be surface treated in unit 110. In some implementations, the carbon fiber product 140, which is obtained from the continuous polymer-asphaltene thread after carbonization and surface treatment can have a tensile strength of at least 3.5 GPa and a Young's modulus of at least 250 GPa. In alternative implementations, the carbonized material 103 can be subjected to a graphitization step 105 before surface treatment in unit 110. In some implementations, an activation step can also be implemented, as explained above, between graphitization and surface treatment. The carbon fiber product 140 that is created after graphitization and surface treatment can present a tensile strength of at least 3 GPa and a Young's modulus of at least 350 GPa. The implementation represented in FIG. 2 can thus lead to a mid- or high-performance carbon fiber product 140, which can optionally be activated.

Figure 3:
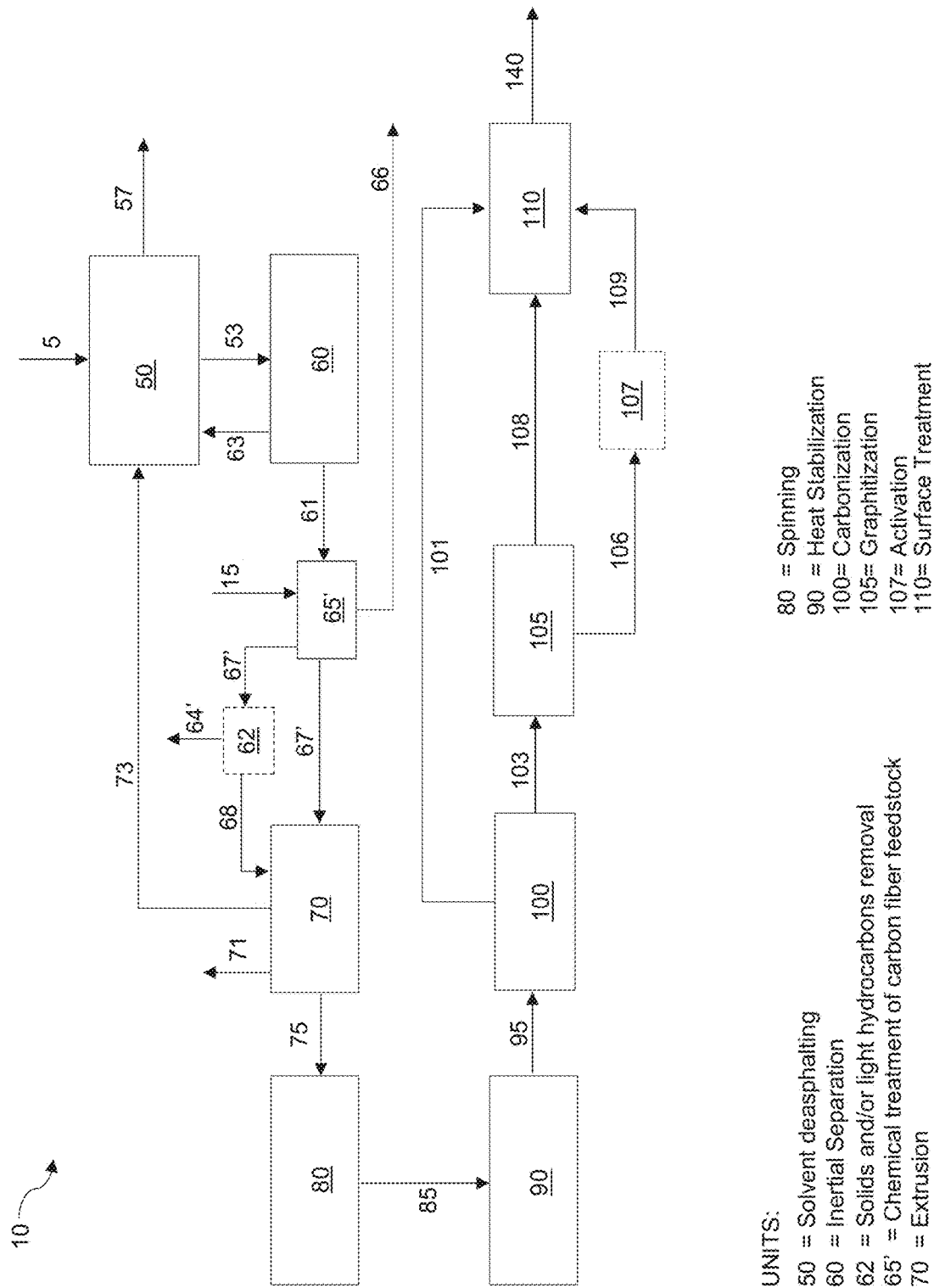
FIG. 3 represents a flow diagram of the process for obtaining a carbon fiber from a heavy hydrocarbon feedstock according to yet another implementation.

In a further implementation of the present technology, as shown in FIG. 3, the solid asphaltene particulate stream 61 can be subjected to a chemical treatment at step 65' before the extrusion step, as will be detailed below. The heavy hydrocarbon feedstock stream 5 containing native asphaltenes is sent to the SDA 50 where the heavy hydrocarbon feedstock stream is contacted with a deasphalting solvent 63 to precipitate asphaltenes from the feedstock and produce the solvent-diluted deasphalted oil stream 57 and the solid asphaltene precipitates-containing stream 53, which also contains residual solvent. The deasphalting solvent is as described above with respect to FIGS. 1 and 2. In this implementation, the solid asphaltene particulate stream 61 is thus sent to a chemical treatment unit 65' where it can be contacted with at least one chemical agent 15 to produce a treated asphaltene particulate stream 67'. In some implementations, the chemical agent can be a Lewis acid, a reducing agent, an oxidizing agent or any mixture thereof. In some implementations, the chemical treatment can be performed using at least one Lewis acid, such as a weak Lewis acid, as the chemical agent. Using such Lewis acid chemical additive can promote the formation of a mesophase, which can, in turn, favor the creation of a final carbon fiber product with higher performance. The use of the Lewis acid(s), in this implementation, can even allow formation of the mesophase at temperatures that are low enough to avoid/limit the formation of coke particles, which can be beneficial for the whole process. In some implementations, the Lewis acid can be selected from aluminum chloride, boron chloride, iron chloride, tin chloride, titanium chloride, aluminum bromide, boron bromide, iron bromide, tin bromide, titanium bromide, or any mixture thereof. In some implementations, aluminum chloride can be used as the Lewis acid. In other implementations, the chemical agent can include an oxidizing agent, such as at least one compound including bromine, silver, chromium, manganese, and/or oxygen, or a peroxide. Examples of oxidizing agents that can be used include $KMnO_4$ and $H_2O_2$ or a combination thereof. In other implementations, the chemical agent can include a reducing agent, which can optionally be used in combination with a Lewis acid and/or an oxidizing agent, as mentioned above. The use of a reducing agent can enable removal of certain impurities present in the solid asphaltene particulate stream 61, such as sulfur and metals for instance. Compounds including lithium, sodium, potassium, magnesium, aluminum, or zinc to name a few examples, are suitable reducing agents. In some implementations, the reducing agent can include sodium hydroxide, potassium hydroxide, a molten sodium salt, a molten potassium salt, urea, $NaBH_4$ or any mixture thereof. In some implementations, the chemical agent can be used in an amount from about 3 to 8 wt % of the asphaltene feedstock up to about 20 to 25 wt % of the asphaltene feedstock. The amount of chemical agent can be selected depending on the complexity of the native asphaltenes and temperatures used for this processing step. In some implementations, the chemical agent can thus be used in an amount from about 3 wt % to about 25 wt %, or from about 3 wt % to about 20 wt %, or from about 8 wt % to about 25 wt %, or from about 8 wt % to about 20 wt %, or any value included in these ranges.

In some implementations, independently of the chemical agent(s) used, the chemical treatment in unit 35' can be performed under heating. For instance, the chemical treatment can be performed at a temperature of about 140° C. to about 335° C. Furthermore, in some implementations, sparging can be considered within chemical treatment unit 65' to produce even more mesophase material by removing lighter components and altering the orientation of the carbon molecules to promote high-performance carbon fiber in stream 140. In some implementations, sparging is conducted with inert nitrogen.

Hence, the solid asphaltene particulate stream 67' that exits unit 65' can contain an asphaltene material, which will promote the creation of a final carbon fiber product with enhanced properties, such as a higher performance. In some implementations, the properties of the final carbon fiber product 140 can be further enhanced by treating the carbon fiber material precursor 67' in an optional cleaning step that can be performed in unit 62. This "cleaning" step can be somewhat similar to the step performed in unit 65 as described above with respect to FIG. 1. Hence, in some implementations, the solid asphaltene particulate stream 67' can be sent to unit 62 for removal of remaining undesirable solids and/or light hydrocarbons and produce a "cleaned" solid asphaltene particulate stream 68. In some implementations, the cleaning can involve filtering the undesirable solids, vacuum distillation to remove the light hydrocarbons and/or a secondary deasphalting. Any lighter material evolved in the vacuum distillation, or similar process, can be recovered and recycled if required in an upstream step, such as the deasphalting step for instance. Where the cleaning step 62 involves a secondary deasphalting, the solvent used for this deasphalting step can include a saturated or unsaturated cyclic or heterocyclic hydrocarbon solvent. In some implementations, the secondary deasphalting solvent can be one or more of toluene, xylene, benzene, tetrahydrofuran, cyclohexanone, quinoline or pyridine, preferably tetrahydrofuran. The resulting chemically treated streams 68, or 67' if the optional step 62 is not performed, can then be further processed as previously described until obtaining the final carbon fiber products 140, i.e., at least by extrusion, spinning, carbonization and surface treatment.

More particularly, stream 67' or 68 is sent to extruding unit 70, where pressure can be applied to the chemically treated solid asphaltenes to remove any remaining entrained solvent. In some implementations, the chemically treated asphaltene particulate stream 67' or 68 can be submitted to a crushing step before extrusion as previously described. In some implementations, the extruder is heated to a temperature in the 200-350° C. range to create conditions to provide continuous flow as a Non-Newtonian fluid through and out of the equipment. The solvent removed in unit 70 can be returned to the SDA unit as stream 73. In another implementation, some of the generated asphaltene extrudate material in stream 71 can be sent to for processing to become activated carbon. All or most of the extruded material can leave the extruding unit 70, as stream 75. In the next step, the extruded material can be treated in the spinning unit 80, where "green" carbon fiber can be produced as stream 85. It is to be noted that in some implementations, extrusion and spinning can be performed in a single unit. The spinning of the chemically treated asphaltenes material resulting in the "green" carbon fiber, can be accomplished by melt, jet or wet spinning. In some implementations, melt spinning is preferably used. After spinning, the green fiber made of a continuous chemically treated asphaltene thread can have a diameter that is less than 15 μm. In some implementations, the diameter of the green fiber can be less than 10 μm. Then, the continuous asphaltene thread or "green" fiber 85 can be further processed as explain above with respect to FIG. 1 or 2, to obtain the final carbon fiber product 140. Hence, the continuous asphaltene thread 85 can be heat stabilized/oxidized in unit 90 to form a stabilized asphaltene stream 95, which can itself be carbonized in unit 100, and then, the carbonized material 101 can be surface treated in unit 110. In some implementations, the carbon fiber product 140, which is obtained from the continuous asphaltene thread after carbonization and surface treatment, can have a tensile strength of at least 3.0 GPa and a Young's modulus of at least 400 GPa. In some implementations, where the chemical treatment, which is carried out in unit 65', includes a treatment with an oxidizing agent, the stabilization/oxidization in unit 90 can be optional since the asphaltene material has already been subjected to an oxidizing treatment. In alternative implementations, the carbonized material is sent as stream 103 to a graphitization step 105 before surface treatment in unit 110. In some implementations, an activation step 107 can also be implemented, as explained above, between graphitization and surface treatment. The carbon fiber product 140 that is created after graphitization and surface treatment can present a tensile strength of at least 2.5 GPa and a Young's modulus of at least 500 GPa. The implementation represented in FIG. 3 can thus lead to a high-performance carbon fiber product 140, which can optionally be activated.

The implementations represented in FIGS. 1 to 3 can allow obtaining carbon fibers with different properties, which can be fine-tuned by implementing some steps using specific parameters (e.g., selecting a particular polymer to be added during extrusion step 70, selecting a specific chemical additive for step 65') and/or by implementing optional steps enabling obtention of a "cleaner" carbon fiber precursor material such as by heating, sparging and/or a secondary deasphalting step before the extrusion step of the process. A variety of carbon fiber products can thus be obtained from general purpose to mid- and high-performance carbon fibers. Such carbon fibers can be obtained directly from a heavy hydrocarbon feedstock, such as containing native asphaltenes, i.e., a feedstock which has not been subjected to upstream cracking for instance. However, in some implementations, as will be discussed below in reference to FIG. 4, the heavy hydrocarbon feedstock can be subjected to certain treatments before the deasphalting treatment in unit 50.

Figure 4:
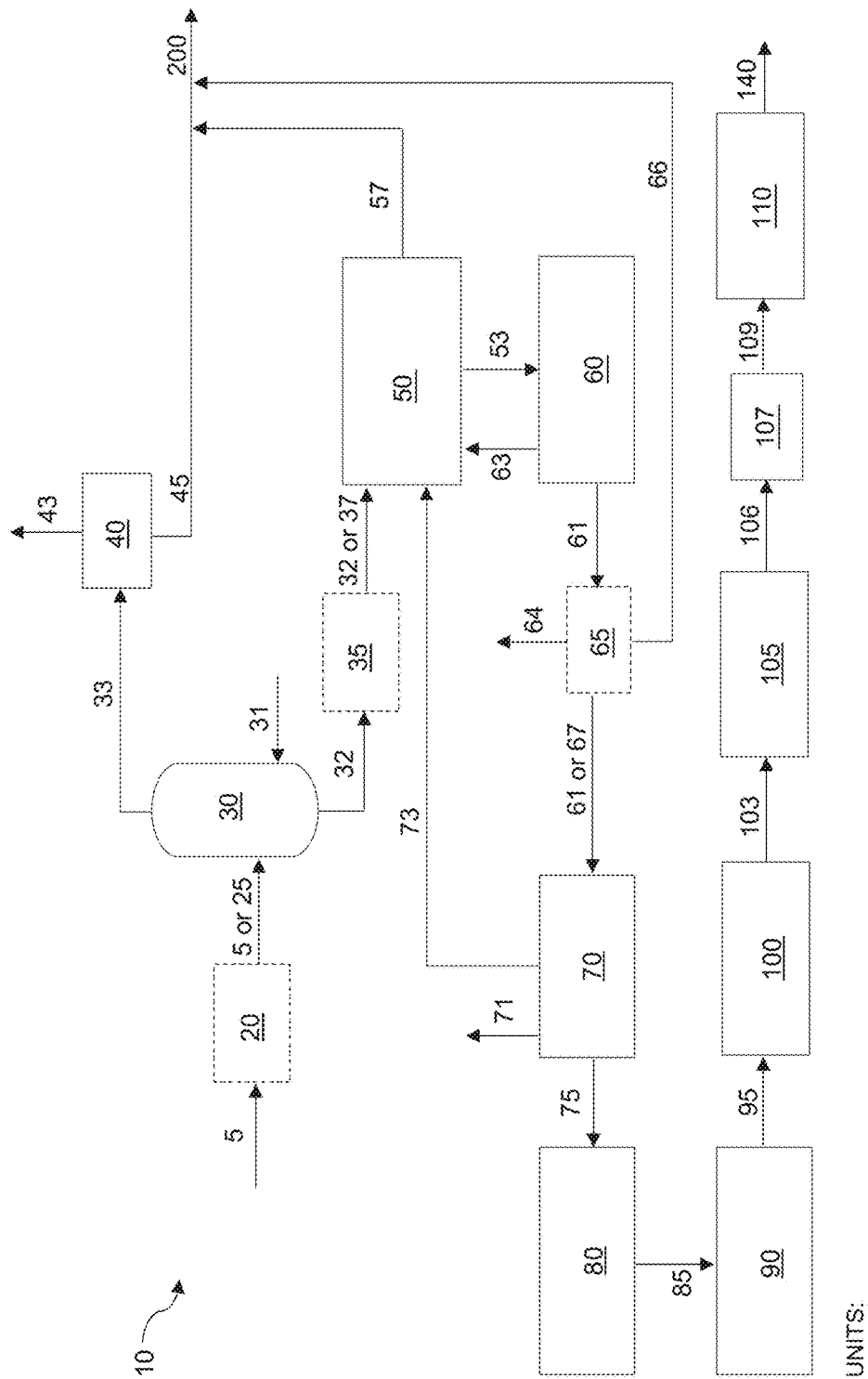
FIG. 4 represents a flow diagram of the process for obtaining a carbon fiber from a heavy hydrocarbon feedstock according to a further implementation.

Hence, in some implementations, as shown in FIG. 4, the heavy hydrocarbon feedstock 5 can be thermally cracked in reactor 30 before the deasphalting treatment in SDA 50. This step can allow recovering a portion of the heavy hydrocarbon feedstock as a light top fraction 33 while producing a heavy bottom fraction 32 containing hydrocarbons, and thermally modified asphaltenes. In reactor 30, the temperature can be controlled and maintained while the feedstock stream can undergo a mild controlled cracking process. A sweep gas 31, can be introduced into the reactor to assist in mixing the liquid pool in the reactor and to assist in removing any evolved vapors from the hydrocarbon feedstock. The sweep gas 31 can be any type of non-condensable vapor that can end up in the fuel gas system for combustion or reuse in the process. Examples of sweep gas can be a hydrocarbon mixture such as natural gas or steam, nitrogen or hydrogen. In some implementations, after the mild cracking process, the light top fraction 33 can be routed from the reactor 30 to a gas liquid condensing separator and olefin saturation process 40. The heavy bottom fraction 32 containing hydrocarbons and thermally modified asphaltenes can be sent to the liquid/solid solvent extraction process 50. The condensed overhead liquid fraction 33 will have a much higher API gravity than the bottom fraction 32. For example, the overhead liquid fraction 33 can have an API gravity of 26 or greater. Although the characteristics of the bottom fraction 32 exiting the reactor 30 can vary depending on the process fluid input into the reactor 30 and the reactor's operating parameters, in some implementations, the bottom fraction 32 can have an API gravity ranging between −5 and 5. In some implementations, the heavy hydrocarbon feedstock 5 can be heated in heater 20 before being sent to the reactor 30 as stream 25. In some implementations, the heater 20 can heat the feedstock 5 to a temperature between about 350° C. and 420° C. (e.g., about 675-790° F.) or between about 370° C. (700° F.) to about 420° C. (790° F.). As mentioned above, an olefin saturation process 40 can receive the vapor stream 33 from the reactor 30 to convert the olefins in this stream to meet pipeline transport specifications. The condensed olefin-saturated liquid exits unit 40 as stream 45 and can be blended with the solvent-diluted deasphalted oil 57 produced in SDA 50 to form pipelinable stream 200. The non-condensable vapor exiting unit 40 as stream 43 can be sent to an $H_2S$ removal unit, such as an amine unit, and the vapor can be readily reused in the process or used as a fuel gas.

The solvent extraction process 50 can be similar to the one described above with reference to FIGS. 1 to 3. The recycled solvent stream 63 and/or 73 can be mixed with the heavy bottom fraction 32 to precipitate the solid asphaltenes therefrom and recover the separated diluted deaslphalted oil as stream 57. In some implementations, additional makeup solvent can be required to mix with stream 32 in separator 50. The asphaltenes can be precipitated in the form of solid powder/solid particulate and subjected to a solid/liquid separation in unit 50, as opposed to a typical liquid/liquid separation. A solid/liquid separation requires less solvent to provide the desired recovery of pipelineable heavy oil. The solvent used in SDA 50 can be a pure hydrocarbon component ideally in the range of $C_5$ to $C_8$, or more practically, a mixture of $C_5$ to $C_8$ extracted from readily available natural gas condensate or diluent that comes in with the heavy crude feed.

The thermal cracker 30, can be operated at conditions that maximize the economic return for producing both the pipelineable crude 200 and the carbon fiber product 140. In some implementations, the process fluid 25 heated to about 350-420° C. or about 370° C.-420° C. (about 700-790° F.) by the heater 20 can undergo a mild controlled cracking process in reactor 30. Appropriately located heaters are provided in reactor 30 to maintain the desired constant temperature generated in heater 20 and to apply uniform heat flux for the fluid. The heaters can provide indirect heat through any source readily available (electric, heat transfer fluid, radiant etc.). To ensure a uniform heat flux, mixing can be applied to the process fluid on a continuous or intermittent basis.

The reactor 30 can be operated while controlling several process variables, including the temperature, pressure, residence time, sweep gas and heat flux, so as to reduce or even prevent coke from forming during the reaction, and minimizing gas production, while also providing optimal conversion of the asphaltene portion of the heavy hydrocarbon to provide the desired mix of refinery-ready feedstock components.

In some implementations, a uniform heat flux between 7000-12000 BTU/hr sq.ft ($22.1$-$37.8$ KW/$m^2$) can be applied to the entire pool of process fluid in the reactor 30 and an operating temperature between about 350-420° C. (about 675-790° F.) can be maintained in the reactor. This can be achieved by the presence of appropriately sized and located heating devices in the reactor. The number of heaters can be set by calculating the optimal dispersion of heat between any two heaters so as to have a uniform temperature throughout the pool and to avoid peak or spot temperatures significantly higher than the target temperature in the reactor. Avoiding peak temperature spots reduces the chance of generating coke in the reactor. In some implementations, the residence time in reactor 30 can be between 1 minute up to 7 hours. As the residence time is increased, the expected concentration of mesophase material can increase. In further implementations, the operating pressure in reactor 30 can be maintained at near atmospheric pressure and can be less than about 50 psig (345 kPa). The pressure range can be controlled on the low end to prevent excessive, premature flashing of hydrocarbon, essentially bypassing the reactor, and limited on the high end to reduce secondary cracking and consequent increased gas yields. In some implementations, the sweep gas 31 can be added to the process fluid in reactor 30 in the range of 0-80 scf/bbl (0-14.24 $Sm^3/Sm^3$) if deemed beneficial to improving the reactor performance. The sweep gas 31 can be natural gas, hydrogen, produced/fuel gas from the process, steam, nitrogen or any other non-reactive, non-condensable gas that will not condense to a liquid. Sweep gas in the dosage of 0-80 scf/bbl (0-14.24 $Sm^3/Sm^3$) of feed can allow to remove the "lighter" hydrocarbon products (i.e., methane to <400° C. (750° F.) boiling point hydrocarbons) as soon as they are formed in the reactor 30 so that there is a minimum of secondary cracking, which could increase gas production and potentially increase olefinic naphtha/distillate production. The sweep gas can also allow the reactor to operate closer to the desired operating pressure (<50 psig (345 kPa)) and temperature. The sweep gas 31 can also be used to provide additional heat and/or mixing to the process fluid in the reactor 30. Each thermal cracking variable can be changed independently, within the ranges suggested, based on the quality of feedstock provided or based on the quality and quantity of each output desired.

In some implementations, the overhead fraction 33 produced in reactor 30 can be directed to a gas liquid separation unit 40, which can comprise a cooler and separation drum, as an example, in which a portion of the overhead fraction 33 that is a condensable liquid product containing naphtha and heavier hydrocarbons can be separated from the gaseous components of the overhead fraction 33. An off-gas line 43 containing undesirable gases such as sour gas, can be provided within the separation unit 40 for those gases to be disposed of, recycled, or subjected to further treatment.

In further implementations, still referring to FIG. 4, a secondary thermal cracking unit 35 can be added to provide additional thermal cracking to the residue portion of the crude being produced as bottom fraction 32 in reactor 30. This optional step can allow generation of more mesophase material from the thermally affected asphaltene solid powder/particulate and the resulting stream 37 is fed to the SDA 50. As previously explained, increasing the mesophase content can contribute to the production of higher performance carbon fiber.

Once the heavy hydrocarbon feedstock 5 has been treated in heater 20, reactor 30, optional unit 35, and SDA 50, the resulting asphaltene-containing stream 53 containing a slurry or suspension of solid asphaltene particulate in the form of a vapor/solid mixture, is sent to the inertial separation unit (ISU) 60 for a solid/vapor separation. Solvent vapor is condensed and returned to the SDA unit 50 for reuse as stream 63. The slurry containing the solid asphaltene particulate is sent to the next step, which can be extruder unit 70 or to an optional pre-conditioning step 65, before extrusion takes place. Hence, in some implementations, the solid asphaltene particulate stream 61 can be directly sent to the next process step, which includes extrusion of the solid asphaltene particulate material in unit 70. In an optional implementation, the solid asphaltene particulate stream 61 exiting the ISU 60 can be further treated in unit 65 before the next extrusion step. Hence, in some implementations, the process can involve sending the solid asphaltene particulate stream 61 to unit 65 where a further treatment is performed to separate any undesirable solids (also referred to as "insolubles") that hinder the generation of carbon fiber, from the solid asphaltene particulate stream 61. The undesirable solids can be removed as stream 64 and a cleaner asphaltene particulate-containing stream 67 can be produced. The undesirable solids that are removed in unit 65 can contain various solid particles, inorganic material, and/or dirt that was present in the feedstock. In some implementations, unit 65 can contain a second solvent deasphalting step using organic solvents that adsorb heavier molecules than the solvent that is used in the SDA 50. The solvents that can be used to reject the heaviest, most undesirable solids in the solid asphaltene particulate stream 61 can include saturated or unsaturated cyclic or heterocyclic hydrocarbon based compounds, such as toluene, xylene, benzene, tetrahydrofuran, cyclohexanone, quinoline and pyridine among others. In some implementations, vacuum distillation can also be used in unit 65, alone or in combination with the second deasphalting step, to remove any remaining lighter molecules that could create voids in the carbon fiber. Any lighter material evolved in the vacuum distillation or similar process, including the saturated or unsaturated cyclic or heterocyclic hydrocarbon based solvent, will end up as stream 66. In addition, sparging can be considered within unit 65 to produce more mesophase material by removing lighter components and altering the orientation of the carbon molecules to promote high-performance carbon fiber in stream 140. Sparging is a process similar to air blowing, and for carbon fiber, sparging is generally conducted with inert nitrogen instead of air.

The solid asphaltene particulate stream 61 or 67 can then enter the extruder unit 70 where pressure can be applied to the solid asphaltenes to remove any remaining entrained solvent. In some implementations, the solid asphaltene particulate stream 61 or 67 can be submitted to a crushing step before extrusion as explained above. In some implementations, the extruder is heated to a temperature in the 200-350° C. range to create conditions to provide continuous flow as a Non-Newtonian fluid through and out of the equipment. The solvent removed in unit 70 can be returned to the SDA unit as stream 73. Some of the generated asphaltene extrudate can be segregated and sent to the solid fuels market, as stream 71, if the market for carbon fiber is saturated or not economic. In another implementation, material in stream 71 can be sent to for processing to become activated carbon. The majority of the extruded asphaltenes leave the extruding unit 70 as stream 75. The next steps, which sequentially can include melt, wet or jet spinning in unit 80, heat stabilization in unit 90, carbonization in unit 100, graphitization in unit 105, activation in unit 107 and surface treatment in unit 110, to finally produce the final carbon fiber product 140, can be performed in the conditions as described above with respect to the implementations shown in FIGS. 1 to 3. More particularly, in some implementations, stabilization in unit 90 can be performed at a stabilizing heat treatment from about 175° C. to about 290° C. (about 350° F. to about 550° F.) for up to 1 hour. In some implementations, carbonization in unit 100 can be performed at a carbonizing heat treatment from about 995° C. to about 2000° C. (about 1823° F. to about 3632° F.) for up to 1 hour. The graphitization step in unit 105 can be carried out by heating the carbonized carbon fiber obtained in the carbonization step to a temperature over 3000° C. (5432° F.). In some implementations, the graphitized carbon fiber resulting from the graphitization in unit 105 can be activated by contacting the graphitized carbon fiber with steam, for instance using steam at a temperature of about 800° C. to about 900° C. and a steam rate of about 100 g/hr to about 200 g/hr. In some implementations, the activated carbon fiber obtained in unit 107 can present a BET surface area of at least 500 m$^2$/g. In some implementations, the activated carbon fiber can have a BET surface area of at least 1000 m$^2$/g.

The carbon fiber product 140, which can be produced from an implementation such as the one discussed with reference to FIG. 4 is thus an activated carbon fiber, which can present various performance depending on whether the optional steps in unit 35 and 65 are implemented. In some implementations, the activated carbon fiber product 140 can have a tensile strength of at least 1 GPa and a Young's modulus of at least 100 GPa. It is to be noted that for this implementation generally aiming to obtain an activated carbon fiber, the tensile strength and Young's modulus are not as critical. As previously mentioned, activation of the carbon fiber is mainly performed to obtain carbon fibers suitable for filtration applications (e.g., to increase water or air purity) and in a form allowing them to be molded to desired shapes for such filtration applications.

As previously mentioned, the processes and systems described herein advantageously allow the production of carbon fiber products, which can be activated, and present performances, which can be fine-tuned depending on the intended application for the final carbon fibers.

Experimentation

Athabasca bitumen with an API of 8.2 was used in the examples. For examples 1, 2 and 3 relating to FIGS. 1, 2 and 3, the bitumen was subjected to an initial solvent deasphalting and inertial separation (steps 50 and 60) to create a stream of native asphaltenes in powder form containing 95 wt % C5+ asphaltenes. The recovery after the solvent deasphalting was 98.4 wt % recovery of the C5+ asphaltenes. The stream of native asphaltenes that was then used in the various processes for obtaining carbon fiber.

Example 1—Native asphaltenes of size below 80 μm were extruded/melt spun as is in an extruder/melt-spinning combination apparatus at 300-310° C., 300 psi melt spin pressure, at 120-140 m/min spinning speed, then stabilized at 400° C. and carbonized at 1200° C. to generate general purpose quality carbon fiber.

Example 2—Native asphaltenes were combined with 30-35 wt % polypropylene for extrusion (step 70) and then wet spun at 100-120° C., at 100-120 m/min spinning speed, then stabilized at 380° C. and carbonized at 1200° C. to generate medium performance carbon fibre.

Example 3—Native asphaltenes were mixed with 15 wt % oxidizing chemical agent ($H_2O_2$) for chemical treatment (step 65') and then melt spun at 290-300° C., at 120-130 m/min spinning speed, then stabilized at 400° C. and carbonized at 1200° C. to generate high-performance carbon fibre.

For Example 4, the Athabasca bitumen was first thermally cracked at near atmospheric conditions (3 psig) (step 30 of FIG. 4) and the thermally affected C5+ asphaltenes were separated by solvent deasphalting and inertial separation (steps 50 and 60) to generate a stream that contains 95 wt % C5+ asphaltenes with 98.4 wt % recovery of the C5+ asphaltenes. The thermally affected C5+ asphaltenes were further conditioned with tetrahydrofuran (step 65). The soluble portion was melt spun at 310-315° C., 305 psi melt spin pressure, at 100-110 m/min spinning speed, then stabilized at 400° C. and carbonized at 1200° C. to generate general purpose quality carbon fibre.

Some properties of the carbon fiber resulting from Examples 1 to 4 are provided in table 1 below.

Graphitization and activation can further be applied to all 4 examples shown in the table to improve the tensile strength and modulus along with improved surface area.

In Example 5, the asphaltene sample created through the process steps from Example 4 was submitted to a graphitization step, where heat was applied at 2200° C. for 10-20 minutes.

In Example 6, the asphaltene sample created through the process steps from Example 4 was submitted to steam activation. Steam at 150 g/hr and 900° C. was applied for 1 hour to the sample to activate the carbon fiber to improve the surface area of the structure for improved filtration applications.

Some properties of the carbon fiber resulting from Examples 5 and 6 are provided in table 2 below. The data for the carbon fiber of Example 4 are also reported in Table 2.

TABLE 1

| Examples | Diameter Green fibre (μm) | Softening Point (° C.) | Tensile Strength (MPa) | Tensile (Young's) Modulus (GPa) |
|---|---|---|---|---|
| Example 1—native asphaltene | 15-20 | 215-220 | 1500 | 200 |
| Example 2—polypropylene addition | 10-15 | 207-212 | 3500 | 250 |
| Example 3—chemical agent addition—$H_2O_2$ | 10-15 | 215-225 | 3000 | 400 |
| Example 4—Thermal crack 1$^{st}$ | 15-20 | 227-230 | 1000 | 100 |

TABLE 2

| Examples | Diameter Green fibre (μm) | Tensile Strength (MPa) | Tensile (Young's) Modulus (GPa) | BET Surface Area (m$^2$/g) |
|---|---|---|---|---|
| Example 4—Thermal crack 1$^{st}$ | 15-20 | 1000 | 100 | 96 |
| Example 5—Graphitized Example 4 sample | 15-20 | 950 | 275 | — |
| Example 6—Activated Example 4 sample | 15-20 | 980 | 95 | 1040 |

What is claimed:

1. A process for producing a carbon fiber product from a heavy hydrocarbon feedstock comprising native asphaltenes, comprising:
   solvent deasphalting the heavy hydrocarbon feedstock comprising native asphaltenes with a solvent to precipitate asphaltenes and form solid asphaltene precipitates and produce deasphalted oil;
   separating the deasphalted oil from the solid asphaltene precipitates to recover a solvent-diluted deasphalted oil stream comprising at least a portion of the solvent, and a slurry stream comprising the asphaltene precipitates and residual solvent;
   separating the slurry stream to produce a solid asphaltene particulate material and a recovered solvent stream;
   treating the solid asphaltene particulate material to obtain the carbon fiber product.

2. The process of claim 1, wherein the heavy hydrocarbon feedstock comprises a bitumen-containing feedstock derived from a surface mining operation or an in situ extraction operation.

3. The process of claim 1, wherein the solvent used for the solvent deasphalting comprises at least one $C_3$-$C_8$ hydrocarbon.

4. The process of claim 1, wherein the solvent used for the solvent deasphalting comprises a mixture of $C_5$-$C_8$ hydrocarbons.

5. The process of claim 1, wherein the solid asphaltene particulate material comprises 95% or more C5+ asphaltenes.

6. The process of claim 1, wherein separating the slurry stream comprises vaporizing the residual solvent to produce a vapour/solid mixture comprising vaporized solvent and the solid asphaltene precipitates, and subjecting the vapour/solid mixture to inertial separation.

7. The process of claim 1, wherein treating the solid asphaltene particulate material comprises:

extruding the solid asphaltene particulate material to produce extruded asphaltenes;

spinning the extruded asphaltenes into a continuous asphaltene thread;

heat treating the continuous asphaltene thread to produce a stabilized asphaltene thread;

carbonizing the stabilized asphaltene thread to produce a carbonized carbon fiber; and conditioning the carbonized carbon fiber to produce the carbon fiber product.

8. The process of claim 7, wherein heat treating is performed at about 175° C. to about 290° C. (about 350° F. to about 550° F.) for up to 1 hour.

9. The process of claim 7, wherein carbonizing is performed at about 995° C. to about 2000° C. (about 1823° F. to about 3632° F.) for up to 1 hour.

10. The process of claim 7, wherein conditioning comprises surface treating and sizing the carbonized carbon fiber to create the carbon fiber product.

11. The process of claim 7, further comprising separating insolubles from the solid asphaltene particulate material, wherein separating the insolubles comprises combining the solid asphaltene particulate material with an insolubles-producing solvent to produce the insolubles, and removing the insolubles from the solid asphaltene particulate material.

12. The process of claim 11, wherein the insolubles-producing solvent is a saturated or unsaturated cyclic or heterocyclic hydrocarbon.

13. The process of claim 11, wherein the insolubles-producing solvent is one or more of toluene, xylene, benzene, tetrahydrofuran, cyclohexanone, quinoline or pyridine.

14. The process of claim 7, wherein conditioning comprises graphitization of the carbonized carbon fiber to form a graphitized carbon fiber, and surface treating and sizing the graphitized carbon fiber to create the carbon fiber product.

15. The process of claim 14, wherein graphitization comprises heating the carbon fiber to over 3000° C. (5432° F.).

16. The process of claim 7, wherein conditioning comprises graphitization of the carbonized carbon fiber to form a graphitized carbon fiber, activating the graphitized carbon fiber to form an activated carbon fiber, and then surface treating and sizing the activated carbon fiber to create the carbon fiber product.

17. The process of claim 16, wherein the graphitized carbon fiber is activated by steam activation.

18. The process of claim 17, wherein activation is performed at a steam temperature of about 800° C. to 900° C. and a steam rate of about 100 g/hr to about 200 g/hr.

19. The process of claim 16, wherein the activated carbon fiber has a BEL surface area of at least 500 $m^2/g$.

20. The process of claim 11, wherein the carbon fiber product has a tensile strength of at least 1.5 GPa and a Young's modulus of at least 200 GPa.

* * * * *